(12) United States Patent
Ikeda

(10) Patent No.: US 10,536,694 B2
(45) Date of Patent: *Jan. 14, 2020

(54) IMAGE PROCESSING DEVICE AND IMAGE PROCESSING METHOD TO APPLY DEBLOCKING FILTER

(71) Applicant: SONY CORPORATION, Tokyo (JP)

(72) Inventor: Masaru Ikeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/013,096

(22) Filed: Jun. 20, 2018

(65) Prior Publication Data

US 2018/0302619 A1   Oct. 18, 2018

Related U.S. Application Data

(63) Continuation of application No. 13/989,091, filed as application No. PCT/JP2011/079031 on Dec. 15, 2011, now Pat. No. 10,080,015.

(30) Foreign Application Priority Data

Jan. 18, 2011  (JP) ................................ 2011-008139
Jun. 28, 2011  (JP) ................................ 2011-142897

(51) Int. Cl.
*H04N 7/12*         (2006.01)
*H04N 19/117*       (2014.01)
(Continued)

(52) U.S. Cl.
CPC ........... *H04N 19/117* (2014.11); *H04N 19/14* (2014.11); *H04N 19/169* (2014.11);
(Continued)

(58) Field of Classification Search
CPC .... H04N 19/117; H04N 19/14; H04N 19/169; H04N 19/176; H04N 19/61; H04N 19/80; H04N 19/86
(Continued)

(56) References Cited

U.S. PATENT DOCUMENTS 6,563,958 B1 *  5/2003  Andrew ................. H04N 19/86
                                                        375/240.27
2006/0147123 A1   7/2006  Kajihata
(Continued)

FOREIGN PATENT DOCUMENTS

CN   101330615 A    12/2008
JP   04-180381 A    6/1992
(Continued)

OTHER PUBLICATIONS

Masaru Ikeda et al., "Parallel Deblocking Filter", Joint Collaborative Team On Video Coding of ITU-T SG16 WP3 and ISO/IEC JTC1/SC29/WG11, JCTVC-D263, 4th meeting, Jan. 2011, 8 pages.
(Continued)

*Primary Examiner* — Jessica M Prince
(74) *Attorney, Agent, or Firm* — Chip Law Group

(57) ABSTRACT

Provided is an image processing device including a decoding section that decodes an encoded stream to generate an image, a line determining section that determines whether to apply a deblocking filter to each of lines perpendicular to a boundary in neighboring blocks neighboring across the boundary in the image generated by the decoding section, and a filtering section that applies the deblocking filter to each line to which the line determining section determines to apply the deblocking filter.

6 Claims, 16 Drawing Sheets

(51) Int. Cl.
H04N 19/176 (2014.01)
H04N 19/169 (2014.01)
H04N 19/61 (2014.01)
H04N 19/14 (2014.01)
H04N 19/80 (2014.01)
H04N 19/86 (2014.01)

(52) U.S. Cl.
CPC .......... *H04N 19/176* (2014.11); *H04N 19/61* (2014.11); *H04N 19/80* (2014.11); *H04N 19/86* (2014.11)

(58) Field of Classification Search
USPC .................................................. 375/240.02
See application file for complete search history.

(56) References Cited

U.S. PATENT DOCUMENTS

| 2008/0123750 | A1  | 5/2008  | Bronstein et al. |             |
|--------------|-----|---------|------------------|-------------|
| 2008/0240252 | A1  | 10/2008 | He               |             |
| 2010/0208806 | A1  | 8/2010  | Yu et al.        |             |
| 2011/0194614 | A1* | 8/2011  | Norkin           | H04N 19/176 |
|              |     |         |                  | 375/240.24  |
| 2013/0251029 | A1  | 9/2013  | Ikeda            |             |
| 2013/0251050 | A1  | 9/2013  | Ikeda et al.     |             |
| 2013/0259142 | A1  | 10/2013 | Ikeda et al.     |             |
| 2013/0266061 | A1  | 10/2013 | An et al.        |             |
| 2013/0287124 | A1* | 10/2013 | Norkin           | H04N 19/176 |
|              |     |         |                  | 375/240.29  |
| 2013/0301743 | A1  | 11/2013 | Ikeda et al.     |             |

FOREIGN PATENT DOCUMENTS

| JP | 09-65336     | A  | 7/1997  |
|----|--------------|----|---------|
| JP | 2005-524346  | A  | 8/2005  |
| JP | 2010-081539  | A  | 4/2010  |
| JP | 2013-519293  | A  | 5/2013  |
| TW | 201004355    | A  | 1/2010  |
| WO | 2008/118562  | A1 | 10/2008 |
| WO | 2009/123033  | A  | 10/2009 |
| WO | 2009/123033  | A1 | 10/2009 |
| WO | 2010/035403  | A  | 4/2010  |
| WO | 2012/113574  | A1 | 8/2012  |
| WO | 2013/034649  | A1 | 3/2013  |

OTHER PUBLICATIONS

Andrey Norkin et al., "Description of CE12: Deblocking Filter", Joint Collaborative Team on Video Coding of ITU-T SG16 WP3 and ISO/IEC JTC1/SC29/WG11, JCTVC-E712_R1, 5th meeting, Mar. 16-23, 2011, 10 pages.
Matihias Narroschke et al., "Decisions for Deblocking", Joint Collaborative Team on Video Coding of ITU-T SG16 WP3 and ISO/IEC JTC1/SC29/WG11,JCTVC-E251, 5th meeting, Mar. 16-23, 2011, 12 pages.
Keiichi Chono et al, "TE10: Conditional Joint Deblocking-Debanding Filter", Joint Collaborative Team on Video Coding of ITU-T SG16 WP3 and ISO/IEC JTC1/SC29/WG11, JCTVC-C091-R1, 3rd Meeting, Oct. 7-15, 2010, 24 pages.
Masaru Ikeda et al., "CE12 Subset2: Parallel Deblocking Filter", Joint Collaborative Team on Video Coding of ITU-T SG16 WP3 and ISO/IEC JTC1/SC29/WG11, JCTVC-E181, 5th Meeting, Mar. 16-23, 2011, 12 pages.
Office Action for JP Patent Application No. 2011-142897, dated Jun. 30, 2015.
Masaru Ikeda et al.,"Parallel Deblocking Improvement", Joint Collaborative Team On Video Coding of ITU-T SG16 WP3 and ISO/IEC JTC1/SC29/WG11, 6th Meeting, Jul. 17, 2011.
Office Action for JP Patent Application No. 2011-142897, dated Nov. 17, 2015.
Office Action for CN Patent Application No. 201180084596.6, dated Nov. 16, 2015.
International Search Report and Written Opinion of PCT Application No. PCT/JP2011/079031, dated Mar. 19, 2012, 08 pages of translation and 08 pages of ISRWO.
International Preliminary Report on Patentability of PCT Application No. PCT/JP2011/079031, dated Aug. 1, 2013, 08 pages of English Translation and 06 pages of IPRP.
Notice of Allowance for U.S. Appl. No. 13/989,091, dated May 18, 2018, 8 pages.
Advisory for U.S. Appl. No. 13/989,091, dated May 18, 2018, 8 pages.
Final Office Action for U.S. Appl. No. 13/989,091, dated Feb. 14, 2018, 6 pages.
Non-Final Office Action for U.S. Appl. No. 13/989,091, dated Aug. 7, 2017, 11 pages.
Final Office Action for U.S. Appl. No. 13/989,091, dated Nov. 8, 2016, 6 pages.
Non-Final Office Action for U.S. Appl. No. 13/989091, dated May 11, 2016, 17 pages.
Office Action for JP Patent Application No. 2017-176291, dated Dec. 25, 2018, 02 pages of Office Action and 01 pages of English Translation.
Office Action for JP Patent Application No. 2017-176291, dated Jul. 3, 2018, 05 pages of Office Action and 04 pages of English Translation.
An, et al., "CE 8 Subtest1: Improved Deblocking Filter", Joint Collaborative Team on Video Coding (JCT-VC) of ITU-T SG16 WP3 and ISO/IEC JTC1/SC29/WG11, JCTVC-D163, Jan. 20-28, 2011, 10 pages.
Ikeda, et al., "Parallel Deblocking Filter" Joint Collaborative Team on Video Coding (JCT-VC) of ITU-T SG16 WP3 and ISO/IEC JTC1/SC29/WG11, JCTVC-D263, Jan. 2011, 09 pages.
Ikeda, et al., "CE12 Subset2: Parallel Deblocking Filter", Joint Collaborative Team on Video Coding (JCT-VC) of ITU-T SG16 WP3 and ISO/IEC JTC1/SC29/WG11, JCTVC-E181, Mar. 16-23, 2011, 12 pages.
Narroschke, et al., "Decisions for Deblocking", Joint Collaborative Team on Video Coding (JCT-VC) of ITU-T SG16 WP3 and ISO/IEC JTC1/SC29/WG11, JCTVC-E251, Mar. 16-23, 2011, 12 pages.
Narroschke, et al., "CE12: Results for Decisions for Deblocking", Joint Collaborative Team on Video Coding (JCT-VC) of ITU-T SG16 WP3 and ISO/IEC JTC1/SC29/WG11, JCTVC-F191, Jul. 14-22, 2011, 11 pages.
Ikeda, et al., "Parallel Deblocking Improvement", Joint Collaborative Team on Video Coding (JCT-VC) of ITU-T SG16 WP3 and ISO/IEC JTC1/SC29/WG11, JCTVC-F214, Jul. 14-22, 2011, 08 pages.
Narroschke, et al., "CE12 Subtest 1: Results for Modified Decisions for Deblocking", Joint Collaborative Team on Video Coding (JCT-VC) of ITU-T SG16 WP3 and ISO/IEC JTC1/SC29/WG11, JCTVC-G590, Nov. 21-30, 2011, 07 pages.

* cited by examiner

IMAGE PROCESSING DEVICE AND IMAGE PROCESSING METHOD TO APPLY DEBLOCKING FILTER

CROSS-REFERENCE TO RELATED APPLICATIONS

The present application is a continuation application of U.S. patent application Ser. No. 13/989,091, filed May 23, 2013, which is a National Stage Entry of PCT/JP2011/079031, filed Dec. 15, 2011, and claims the benefit of priority from Japanese Priority Patent Application JP 2011-142897 filed in the Japan Patent Office on Jun. 28, 2011 and Japanese Priority Patent Application JP 2011-008139 filed in the Japan Patent Office on Jan. 18, 2011, the entire contents of which are hereby incorporated by reference.

TECHNICAL FIELD

The present disclosure relates to an image processing device and an image processing method.

BACKGROUND ART

H.264/AVC, one of the standard specifications for image encoding schemes, applies a deblocking filter to a block boundary in units of blocks each containing 4×4 pixels, for example, in order to reduce image quality degradation due to blocking artifacts produced when encoding an image. The deblocking filter is highly compute-intensive, and may account for 50% of the entire processing load when decoding an image, for example.

The standards work for High Efficiency Video Coding (HEVC), a next-generation image coding scheme, proposes application of the deblocking filter in units of blocks each containing 8×8 pixels or more according to JCTVC-A119 (see Non-Patent Literature 1). The technique proposed in JCTVC-A119 increases the block size of the minimum unit to which the deblocking filter is applied. The technique also determines the need to apply the deblocking filter on a per-block basis, similarly to H.264/AVC.

CITATION LIST

Non-Patent Literature

Non-Patent Literature 1: K. Ugur (Nokia), K. R. Andersson (LM Ericsson), A. Fuldseth (Tandberg Telecom), "JCTVC-A119: Video coding technology proposal by Tandberg, Nokia, and Ericsson", Documents of the first meeting of the Joint Collaborative Team on Video Coding (JCT-VC), Dresden, Germany, 15-23 Apr. 2010.

SUMMARY OF INVENTION

Technical Problem

However, image degradation caused by blocking artifacts is not necessarily exhibited uniformly within a block. In other words, there is a possibility that the image quality is already good in part of a block determined to need the application of the deblocking filter. Likewise, there is a possibility that the image quality actually may be degraded in part of a block determined to not need the application of the deblocking filter. Applying the deblocking filter to a part with good image quality may in fact impair that image quality. Meanwhile, if the deblocking filter is not applied to a part with degraded image quality, image quality does not improve.

Consequently, it is desirable to provide an image processing device and an image processing method able to more suitably determine the range to which to apply the deblocking filter.

Solution to Problem

According to an embodiment, there is provided an image processing device including a decoding section that decodes an encoded stream to generate an image, a line determining section that determines whether to apply a deblocking filter for to each of lines perpendicular to a boundary in neighboring blocks neighboring across the boundary in the image generated by the decoding section, and a filtering section that applies the deblocking filter to each line to which the line determining section determines to apply the deblocking filter.

The image processing device may be typically realized as an image decoding device that decodes an image.

Further, according to another embodiment, there is provided an image processing method including decoding an encoded stream to generate an image, determining whether to apply a deblocking filter to each of lines perpendicular to a boundary in neighboring blocks neighboring across the boundary in the generated image, and applying the deblocking filter to each line to which the application of the deblocking filter is determined.

Further, according to another embodiment, there is provided an image processing device including a line determining section that determines whether to apply a deblocking filter to each of lines perpendicular to a boundary in neighboring blocks neighboring across the boundary in a locally decoded image at a time of encoding an image to be encoded, a filtering section that applies the deblocking filter to each line to which the line determining section determines to apply the deblocking filter, and an encoding section that encodes the image to be encoded by using the image filtered by the filtering section.

The image processing device may be typically realized as an image encoding device that encodes an image.

Further, according to another embodiment, there is provided an image processing method including determining whether to apply a deblocking filter to each of lines perpendicular to a boundary in neighboring blocks neighboring across the boundary in a locally decoded image at a time of encoding an image to be encoded, applying the deblocking filter to each line to which the application of the deblocking filter is determined, and encoding the image to be encoded by using the filtered image.

Advantageous Effects of Invention

According to an image processing device and an image processing method in accordance with the present disclosure, it is possible to more suitably determine the range to which to apply the deblocking filter.

DESCRIPTION OF EMBODIMENT

Hereinafter, a preferred embodiment of the present disclosure will be described in detail with reference to the appended drawings. Note that, in this specification and the drawings, elements that have substantially the same function and structure are denoted with the same reference signs, and repeated explanation is omitted.

The description will proceed in the following sequence.
1. Device Overview
  1-1. Image Encoding Device
  1-2. Image Decoding Device
2. Existing Technique
3. First Working Example
  3-1. Deblocking Filter Configuration Example
  3-2. Process Flow
4. Second Working Example
  4-1. Deblocking Filter Configuration Example
  4-2. Process Flow
5. Third Working Example
  5-1. Deblocking Filter Configuration Example
  5-2. Process Flow
6. Example Applications
7. Conclusion
1. Device Overview With reference to FIGS. 1 and 2, the following describes an overview of exemplary devices to which the technology disclosed in this specification is applicable. The technology disclosed in this specification is applicable to an image encoding device and an image decoding device, for example.

[1-1. Image Encoding Device]

Figure 1:
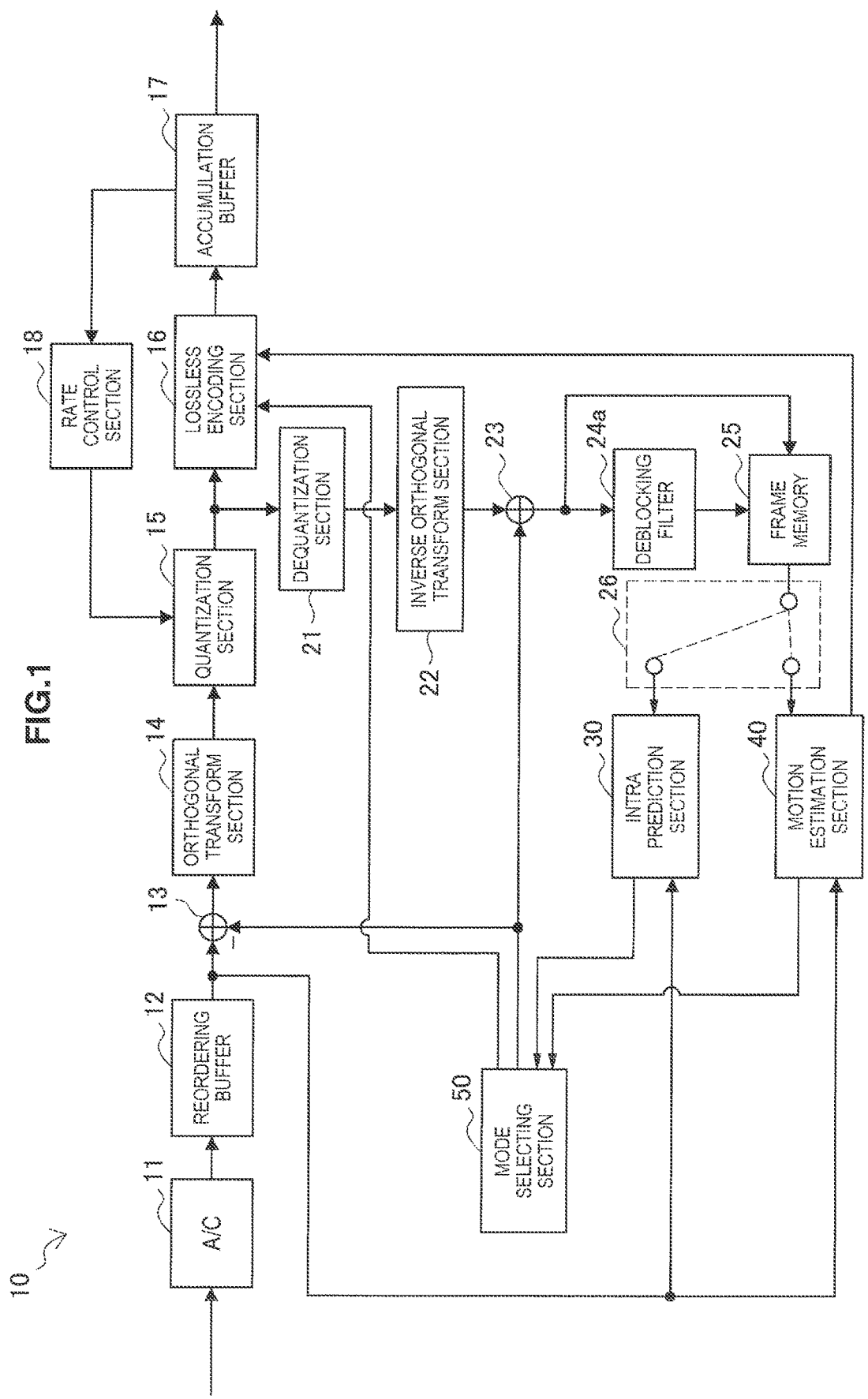
FIG. 1 is a block diagram illustrating an exemplary configuration of an image encoding device according to an embodiment.

FIG. 1 is a block diagram illustrating an exemplary configuration of an image encoding device 10 according to an embodiment. Referring to FIG. 1, the image encoding device 10 includes an analog-to-digital (A/D) conversion section 11, a reordering buffer 12, a subtraction section 13, an orthogonal transform section 14, a quantization section 15, a lossless encoding section 16, an accumulation buffer 17, a rate control section 18, a dequantization section 21, an inverse orthogonal transform section 22, an addition section 23, a deblocking filter 24a, frame memory 25, a selector 26, an intra prediction section 30, a motion estimation section 40, and a mode selecting section 50.

The A/D conversion section 11 converts an image signal input in an analog format into image data in a digital format, and outputs a sequence of digital image data to the reordering buffer 12.

The reordering buffer 12 reorders the images included in the sequence of image data input from the A/D conversion section 11. After reordering the images according to a group of pictures (GOP) structure given by the encoding process, the reordering buffer 12 outputs the reordered image data to the subtraction section 13, the intra prediction section 30, and the motion estimation section 40.

The subtraction section 13 is supplied with the image data input from the reordering buffer 12, and predicted image data selected by the mode selecting section 50 described later. The subtraction section 13 calculates prediction error data, which is the difference between the image data input from the reordering buffer 12 and the predicted image data input from the mode selecting section 50, and outputs the calculated prediction error data to the orthogonal transform section 14.

The orthogonal transform section 14 performs an orthogonal transform on the prediction error data input from the subtraction section 13. The orthogonal transform to be performed by the orthogonal transform section 14 may be the discrete cosine transform (DCT) or the Karhunen-Loeve transform, for example. The orthogonal transform section 14 outputs transform coefficient data acquired by the orthogonal transform process to the quantization section 15.

The quantization section 15 is supplied with the transform coefficient data input from the orthogonal transform section 14, and a rate control signal from the rate control section 18 described later. The quantization section 15 quantizes the transform coefficient data, and outputs the quantized transform coefficient data (hereinafter referred to as quantized data) to the lossless encoding section 16 and the dequantization section 21. Also, the quantization section 15 switches a quantization parameter (a quantization scale) on the basis of the rate control signal from the rate control section 18 to thereby change the bit rate of the quantized data to be input into the lossless encoding section 16.

The lossless encoding section 16 is supplied with the quantized data input from the quantization section 15, and information described later about intra prediction or inter prediction generated by the intra prediction section 30 or the motion estimation section 40 and selected by the mode selecting section 50. The information about intra prediction may include prediction mode information indicating an optimal intra prediction mode for each block, for example. Also, the information about inter prediction may include prediction mode information for prediction of a motion vector for each block, differential motion vector information, reference image information, and the like, for example.

The lossless encoding section 16 generates an encoded stream by performing a lossless encoding process on the quantized data. The lossless encoding by the lossless encoding section 16 may be variable-length coding or arithmetic coding, for example. Furthermore, the lossless encoding section 16 multiplexes the information about intra prediction or the information about inter prediction mentioned above into the header of the encoded stream (for example, a block header, a slice header or the like). Then, the lossless encoding section 16 outputs the encoded stream thus generated to the accumulation buffer 17.

The accumulation buffer 17 temporarily buffers the encoded stream input from the lossless encoding section 16. Then, the accumulation buffer 17 outputs the encoded stream thus buffered at a rate according to the bandwidth of a transmission channel (or an output line from the image encoding device 10).

The rate control section 18 monitors the free space in the accumulation buffer 17. Then, the rate control section 18 generates a rate control signal according to the free space in the accumulation buffer 17, and outputs the generated rate control signal to the quantization section 15. For example, when there is not much free space in the accumulation buffer 17, the rate control section 18 generates a rate control signal for lowering the bit rate of the quantized data. Also, for example, when there is sufficient free space in the accumulation buffer 17, the rate control section 18 generates a rate control signal for raising the bit rate of the quantized data.

The dequantization section 21 performs an dequantization process on the quantized data input from the quantization section 15. Then, the dequantization section 21 outputs transform coefficient data acquired by the dequantization process to the inverse orthogonal transform section 22.

The inverse orthogonal transform section 22 performs an inverse orthogonal transform process on the transform coefficient data input from the dequantization section 21 to thereby restore the prediction error data. Then, the inverse orthogonal transform section 22 outputs the restored prediction error data to the addition section 23.

The addition section 23 adds the restored prediction error data input from the inverse orthogonal transform section 22 and the predicted image data input from the mode selecting section 50 to thereby generate decoded image data. Then, the addition section 23 outputs the decoded image data thus generated to the deblocking filter 24*a* and the frame memory 25.

The deblocking filter 24*a* performs a filtering process to reduce blocking artifacts produced during image encoding. More specifically, the deblocking filter 24*a* determines the need for filtering on a per-line basis for each block boundary in the decoded image data input from the addition section 23. The deblocking filter 24*a* then applies a deblocking filter for any lines determined to need the application of the filter. In the case where the block boundary is a vertical boundary, the above line is equivalent to a row perpendicular to the vertical boundary. In the case where the block boundary is a horizontal boundary, the above line is equivalent to a column perpendicular to the horizontal boundary. In addition to the decoded image data from the addition section 23, information used to determine the need for filtering (such as mode information, transform coefficient information, and motion vector information, for example) is also input into the deblocking filter 24*a*. After that, the deblocking filter 24*a* outputs filtered decoded image data with blocking artifacts removed to the frame memory 25. Processing conducted by the deblocking filter 24*a* will be later described in detail.

The frame memory 25 stores the decoded image data input from the addition section 23 and the decoded image data after filtering input from the deblocking filter 24*a*.

The selector 26 reads, from the frame memory 25, unfiltered decoded image data to be used for intra prediction, and supplies the decoded image data thus read to the intra prediction section 30 as reference image data. Also, the selector 26 reads, from the frame memory 25, the filtered decoded image data to be used for inter prediction, and supplies the decoded image data thus read to the motion estimation section 40 as reference image data.

The intra prediction section 30 performs an intra prediction process in each intra prediction mode, on the basis of the image data to be encoded that is input from the reordering buffer 12, and the decoded image data supplied via the selector 26. For example, the intra prediction section 30 evaluates the prediction result of each intra prediction mode using a predetermined cost function. Then, the intra prediction section 30 selects the intra prediction mode yielding the smallest cost function value, that is, the intra prediction mode yielding the highest compression ratio, as the optimal intra prediction mode. Furthermore, the intra prediction section 30 outputs information about intra prediction, which includes prediction mode information indicating the optimal intra prediction mode, to the mode selecting section 50, together with the predicted image data and the cost function value.

The motion estimation section 40 performs an inter prediction process (prediction process between frames) on the basis of image data to be encoded that is input from the reordering buffer 12, and decoded image data supplied via the selector 26. For example, the motion estimation section 40 evaluates the prediction result of each prediction mode using a predetermined cost function. Then, the motion estimation section 40 selects the prediction mode yielding the smallest cost function value, that is, the prediction mode yielding the highest compression ratio, as the optimal prediction mode. The motion estimation section 40 generates predicted image data according to the optimal prediction mode. The motion estimation section 40 outputs information about inter prediction, which includes prediction mode information indicating the optimal intra prediction mode thus selected, to the mode selecting section 50, together with the predicted image data and the cost function value.

The mode selecting section 50 compares the cost function value related to intra prediction input from the intra prediction section 30 to the cost function value related to inter prediction input from the motion estimation section 40. Then, the mode selecting section 50 selects the prediction method with the smaller cost function value between intra prediction and inter prediction. In the case of selecting intra prediction, the mode selecting section 50 outputs the information about intra prediction to the lossless encoding section 16, and also outputs the predicted image data to the subtraction section 13 and the addition section 23. Also, in the case of selecting inter prediction, the mode selecting section 50 outputs the information about inter prediction described above to the lossless encoding section 16, and also outputs the predicted image data to the subtraction section 13 and the addition section 23.

[1-2. Image Decoding Device]

Figure 2:
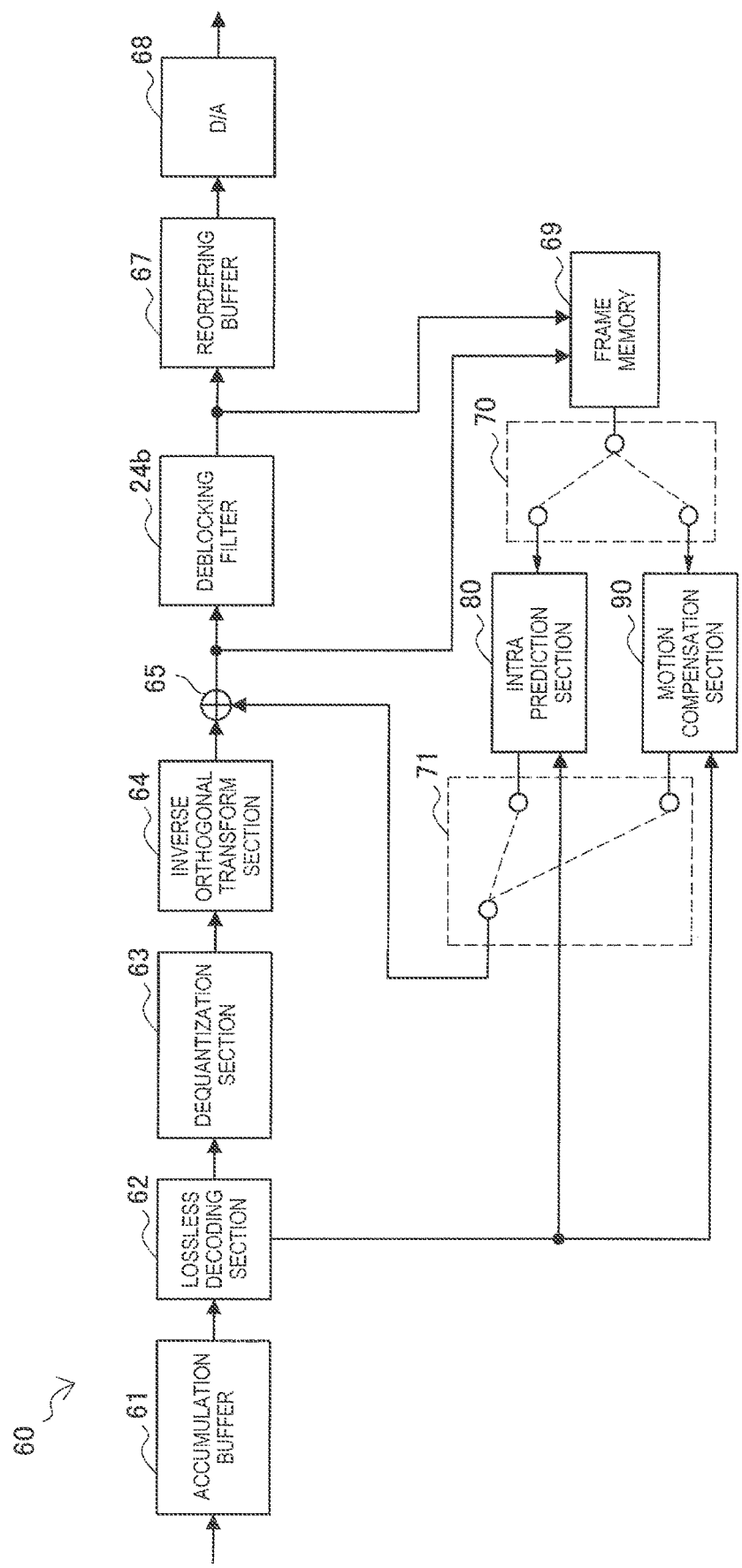
FIG. 2 is a block diagram illustrating an exemplary configuration of an image decoding device according to an embodiment.

FIG. 2 is a block diagram illustrating an exemplary configuration of an image decoding device 60 according to an embodiment. With reference to FIG. 2, the image decoding device 60 includes an accumulation buffer 61, a lossless decoding section 62, a dequantization section 63, an inverse orthogonal transform section 64, an addition section 65, a deblocking filter 24b, a reordering buffer 67, a digital-to-analog (D/A) conversion section 68, frame memory 69, selectors 70 and 71, an intra prediction section 80, and a motion compensation section 90.

The accumulation buffer 61 temporarily buffers an encoded stream input via a transmission channel.

The lossless decoding section 62 decodes the encoded stream input from the accumulation buffer 61 according to the coding method used at the time of encoding. Also, the lossless decoding section 62 decodes information multiplexed into the header region of the encoded stream. Information that is multiplexed into the header region of the encoded stream may include information about intra prediction and information about inter prediction in the block header, for example. The lossless decoding section 62 outputs the information about intra prediction to the intra prediction section 80. Also, the lossless decoding section 62 outputs the information about inter prediction to the motion compensation section 90.

The dequantization section 63 dequantizes quantized data which has been decoded by the lossless decoding section 62. The inverse orthogonal transform section 64 generates prediction error data by performing an inverse orthogonal transform on transform coefficient data input from the dequantization section 63 according to the orthogonal transform method used at the time of encoding. Then, the inverse orthogonal transform section 64 outputs the generated prediction error data to the addition section 65.

The addition section 65 adds the prediction error data input from the inverse orthogonal transform section 64 to predicted image data input from the selector 71 to thereby generate decoded image data. Then, the addition section 65 outputs the decoded image data thus generated to the deblocking filter 24b and the frame memory 69.

The deblocking filter 24b performs a filtering process to reduce blocking artifacts appearing in a decoded image. More specifically, the deblocking filter 24b determines the need for filtering on a per-line basis for each block boundary in the decoded image data input from the addition section 65. The deblocking filter 24b then applies a deblocking filter for any lines determined to need the application of the filter. In addition to the decoded image data from the addition section 65, information used to determine the need for filtering is also input into the deblocking filter 24b. After that, the deblocking filter 24b outputs decoded image data thus filtered with blocking artifacts removed to the reordering buffer 67 and the frame memory 69. Processing conducted by the deblocking filter 24b will be later described in detail.

The reordering buffer 67 generates a chronological sequence of image data by reordering images input from the deblocking filter 24b. Then, the reordering buffer 67 outputs the generated image data to the D/A conversion section 68.

The D/A conversion section 68 converts the image data in a digital format input from the reordering buffer 67 into an image signal in an analog format. Then, the D/A conversion section 68 causes an image to be displayed by outputting the analog image signal to a display (not illustrated) connected to the image decoding device 60, for example.

The frame memory 69 stores the unfiltered decoded image data input from the addition section 65 and the filtered decoded image data input from the deblocking filter 24b.

The selector 70 switches the output destination of the image data from the frame memory 69 between the intra prediction section 80 and the motion compensation section 90 for each block in the image according to mode information acquired by the lossless decoding section 62. For example, in the case where an intra prediction mode is specified, the selector 70 outputs the unfiltered decoded image data that is supplied from the frame memory 69 to the intra prediction section 80 as reference image data. Also, in the case where an inter prediction mode is specified, the selector 70 outputs the filtered decoded image data that is supplied from the frame memory 69 to the motion compensation section 90 as reference image data.

The selector 71 switches the output source of predicted image data to be supplied to the addition section 65 between the intra prediction section 80 and the motion compensation section 90 for each block in the image according to the mode information acquired by the lossless decoding section 62. For example, in the case where an intra prediction mode is specified, the selector 71 supplies the addition section 65 with the predicted image data output from the intra prediction section 80. In the case where an inter prediction mode is specified, the selector 71 supplies the addition section 65 with the predicted image data output from the motion compensation section 90.

The intra prediction section 80 performs in-picture prediction of pixel values on the basis of the information about intra prediction input from the lossless decoding section 62 and the reference image data from the frame memory 69, and generates predicted image data. Then, the intra prediction section 80 outputs the predicted image data thus generated to the selector 71.

The motion compensation section 90 performs a motion compensation process on the basis of the information about inter prediction input from the lossless decoding section 62 and the reference image data from the frame memory 69, and generates predicted image data. Then, the motion compensation section 90 outputs the predicted image data thus generated to the selector 71.

2. Existing Technique

Generally, processes using a deblocking filter in an existing image coding scheme such as H.264/AVC or HEVC include two types of processes, namely, a filtering need determination process and a filtering process. The following describes these two processes, taking HEVC as an example.

(1) Filtering Need Determination Process

The filtering need determination process determines whether or not the deblocking filter needs to be applied to each block boundary within an input image. Block boundaries include vertical boundaries between horizontally neighboring blocks and horizontal boundaries between vertically neighboring blocks. JCTVC-A119 uses a block size of 8×8 pixels as a minimum processing unit. For example, a macroblock of 16×16 pixels includes four blocks of 8×8 pixels. The process is applied to one (left) vertical boundary and one (top) horizontal boundary for each block, namely, four boundaries plus four boundaries for a total of eight boundaries. In this specification, the term macroblock encompasses a coding unit (CU) in the context of HEVC.

Figure 3:
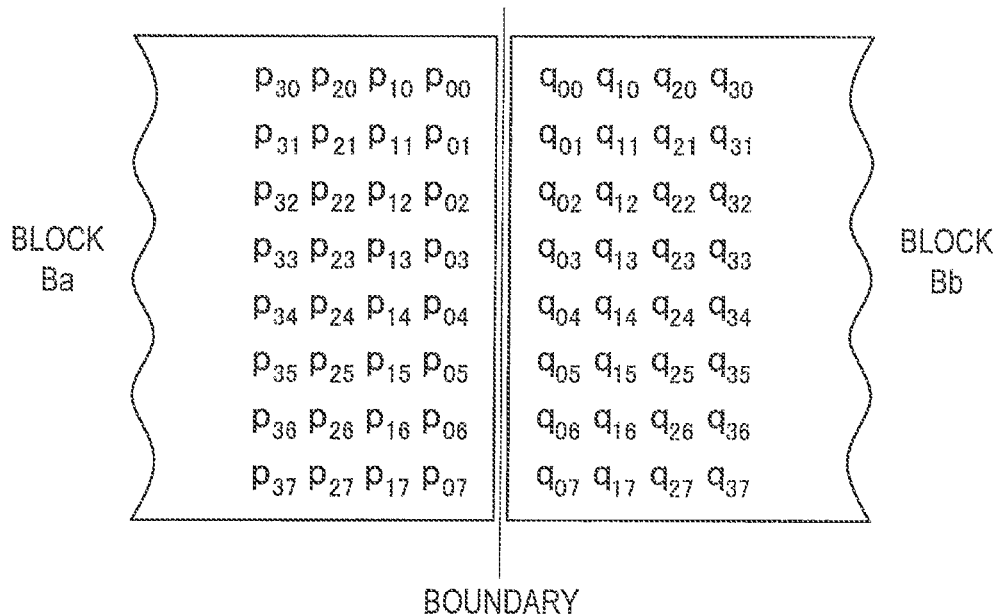
FIG. 3 is an explanatory diagram illustrating an example of pixels neighboring across a boundary.

FIG. 3 is an explanatory diagram illustrating an example of pixels in two blocks Ba and Bb neighboring across a boundary. In this specification, blocks neighboring each other across a boundary in this way are called neighboring blocks. Although the following describes a vertical boundary as an example, the matter described herein is obviously also applicable to a horizontal boundary. The example in FIG. 3 uses the symbol $p_{ij}$ to represent pixels in block Ba. In this symbol, i denotes a column index and j denotes a row index. The column index i is numbered 0, 1, 2, and 3 in order (from right to left) from the column nearest the vertical boundary. The row index j is numbered 0, 1, 2, . . . , 7 from top to bottom. Note that the left half of block Ba is omitted from the drawing. Meanwhile, the symbol $q_{kj}$ is used to represent pixels in block Bb. In this symbol, k denotes a column index and j denotes a row index. The column index k is numbered 0, 1, 2, and 3 in order (from left to right) from the column nearest the vertical boundary. Note that the right half of block Bb is omitted from the drawing.

The following conditions can be used to determine whether or not to apply the deblocking filter to the vertical boundary between blocks Ba and Bb illustrated in FIG. 3.

Determination condition for brightness component (luma). The deblocking filter is applied if conditions A and B are both true.

Condition A:
(A1) Block Ba or Bb is in an intra prediction mode;
(A2) Block Ba or Bb has a nonzero orthogonal transform coefficient; or
(A3) |MVAx−MVBx|≤4 or |MVAy−MVBy|≤4

Condition B:
$|p_{22}-2p_{12}+p_{02}|+|q_{22}-2q_{12}+q_{02}|+|p_{25}-2p_{15}+p_{05}|+|q_{25}-2q_{15}+q_{05}|<\beta$ Condition A3 assumes a motion vector for block Ba to be (MVAx, MVAy) and a motion vector for block Bb to be (MVBx, MVBy) at Qpel (quarter pixel) precision. In condition B, β is an edge determination threshold value. The default value of β is given according to the quantization parameter. The value of β is user-specifiable using a parameter within the slice header.

Determination condition for color component (chroma). The deblocking filter is applied if condition A1 is true.

Condition A1: Block Ba or Bb is in an intra prediction mode.

Figure 4:
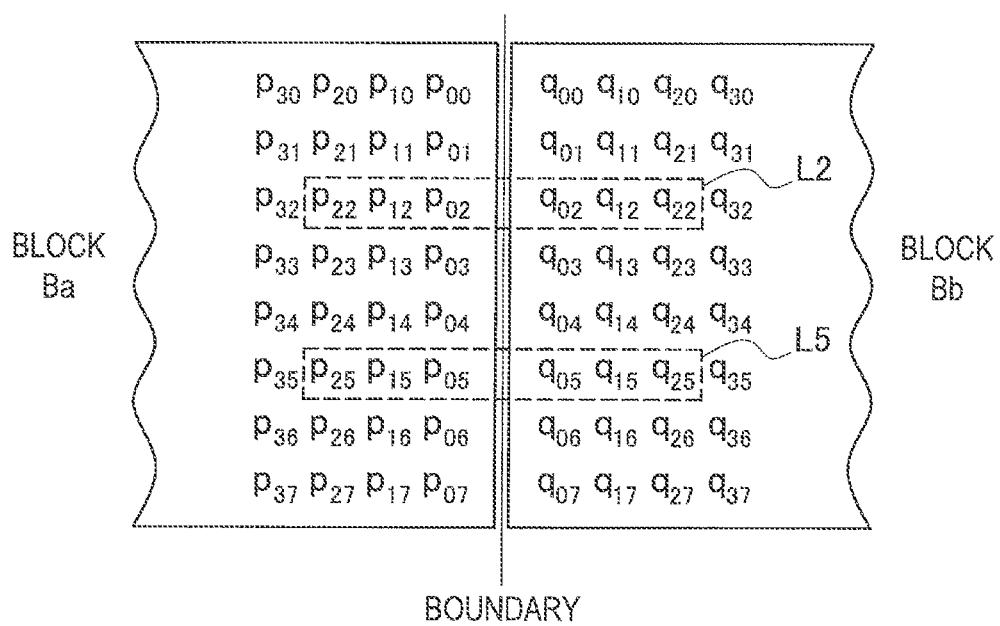
FIG. 4 is an explanatory diagram for explaining a filtering need determination process in an existing technique.

In other words, in a typical filtering need determination process for a vertical boundary (particularly, the determination of the luma component determination condition B), pixels in the 2nd and 5th rows of each block (taking the uppermost row as the 0th row) are referenced, as indicated by the broken-line frames L2 and L5 in FIG. 4. A deblocking filter is then applied to the blocks to the left and right of the vertical boundary determined to need the application of the deblocking filter according to the above determination conditions. Similarly, in a filtering need determination process for a horizontal boundary, pixels in the 2nd and 5th columns of each block (not illustrated in FIG. 4) are referenced. A deblocking filter is then applied to the blocks above and below the vertical boundary determined to need the application of the deblocking filter according to the above determination conditions.

(2) Filtering Process

If a boundary is determined to need the application of the deblocking filter, a filtering process is performed on pixels to the left and right of a vertical boundary, or on pixels above and below a horizontal boundary. For the luma component, the filter strength is switched between a strong filter and a weak filter according to the pixel values.

Filtering Luma Component

Selecting the strength. The filter strength is selected for each row or column. The strong filter is selected if all of the following conditions C1 through C3 are satisfied. The weak filter is selected if any one of the conditions is not satisfied.

(C1) $d<(\beta>>2)$
(C2) $(|p_{3j}-p_{0j}|+|q_{0j}-q_{3j}|)<(\beta>>3)$
(C3) $|p_{0j}-q_{0j}|<((5tc+1)>>1)$ where j denotes a row index for a vertical boundary or a column index for a horizontal boundary, and d represents:

$$d=|p_{22}-2p_{12}+p_{02}|+|q_{22}-2q_{12}+q_{02}|+|p_{25}-2p_{15}+p_{05}|+|q_{25}-2q_{15}+q_{05}|$$

Weak Filtering:

$$\Delta=\text{Clip}(-tc,tc,(13(q_{0j}-p_{0j})+4(q_{1j}-p_{1j})-5(q_{2j}-p_{2j})+16)>>5))$$

$$p_{0j}=\text{Clip}_{0-255}(p_{0j}+\Delta)$$

$$q_{0j}=\text{Clip}_{0-255}(q_{0j}-\Delta)$$

$$p_{1j}=\text{Clip}_{0-255}(p_{1j}+\Delta/2)$$

$$q_{1j}=\text{Clip}_{0-255}(q_{1j}-\Delta/2)$$

Strong Filtering:

$$p_{0j}=\text{Clip}_{0-255}((p_{2j}+2p_{1j}+2p_{0j}+2q_{0j}+q_{1j}+4)>>3)$$

$$q_{0j}=\text{Clip}_{0-255}((p_{1j}+2p_{0j}+2q_{0j}+2q_{1j}+q_{2j}+4)>>3)$$

$$p_{1j}=\text{Clip}_{0-255}((p_{2j}+p_{1j}+p_{0j}+q_{0j}+2)>>2)$$

$$q_{1j}=\text{Clip}_{0-255}((p_{0j}+q_{0j}+q_{1j}+q_{2j}+2)>>2)$$

$$p_{2j}=\text{Clip}_{0-255}((2p_{3j}+3p_{2j}+p_{1j}+p_{0j}+q_{0j}+4)>>3)$$

$$q_{2j}=\text{Clip}_{0-255}((p_{0j}+q_{0j}+q_{1j}+3q_{2j}+2q_{3j}+4)>>3)$$

Herein, Clip(a, b, c) denotes a process to clip value c within the range of a≤c≤b and $\text{Clip}_{0-255}$(c) denotes a process to clip value c within the range of 0≤c≤255.

Filtering Chroma Component:

$$\Delta=\text{Clip}(-tc,tc,((((q_{0j}-p_{0j})<<2)+p_{1j}-q_{1j}+4)>>3))$$

$$p_{0j}=\text{Clip}_{0-255}(p_{0j}+\Delta)$$

$$q_{0j}=\text{Clip}_{0-255}(q_{0j}-\Delta)$$

Figure 5:
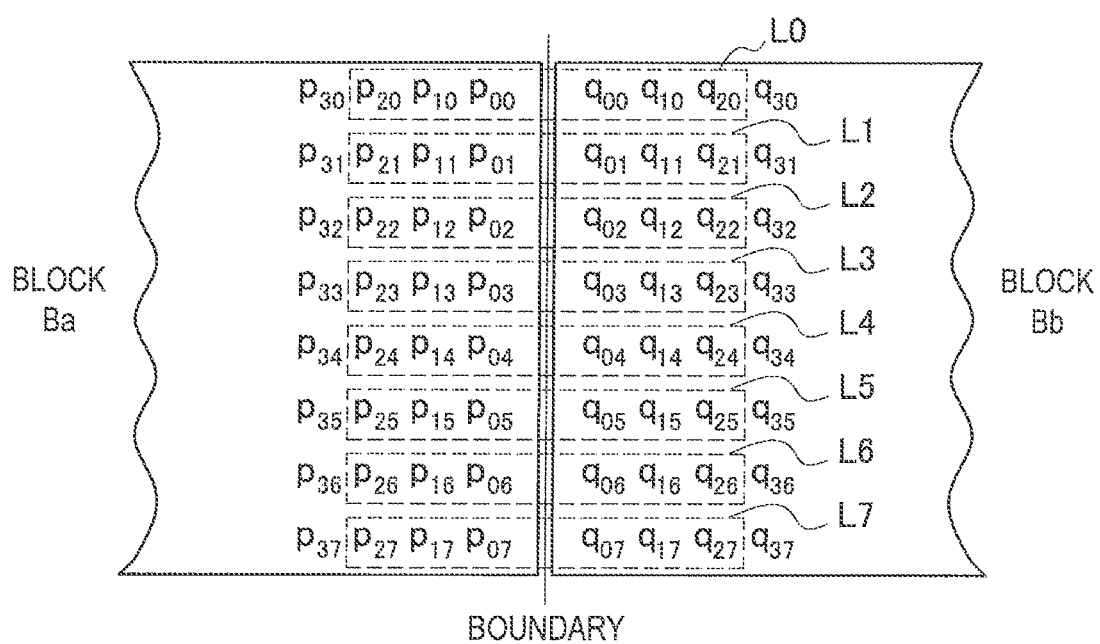
FIG. 5 is an explanatory diagram for explaining a filtering process in an existing technique.

The luma component and chroma component filtering is conducted on all rows or columns of blocks Ba and Bb (that is, for all integers j where 0≤j≤7). In other words, if a vertical boundary is determined to need filtering, one or more pixel values are updated on all lines L0 to L7 perpendicular to the vertical boundary, as illustrated in FIG. 5. Similarly, if a horizontal boundary is determined to need filtering, one or more pixel values are updated on all lines L0 to L7 perpendicular to the horizontal boundary.

As these explanations demonstrate, with an existing technique, the determination of filtering need is conducted on each boundary lying between two neighboring blocks in an image. In this specification, such a determination is called per-block determination. For a given boundary, it is not determined whether filtering is partially necessary. For this reason, only a binary selection of whether to filter an entire block or not filter an entire block can be made, even if image quality degradation caused by blocking artifacts only appears in some of the pixels in the block. This entails two types of defects: lowered image quality due to the needless application of the deblocking filter to portions with good image quality, and missed opportunities for image quality improvement due to not applying the deblocking filter to portions with degraded image quality. Thus, in the two working examples of deblocking filters described hereinafter, the range to which to apply the deblocking filter is determined at a finer granularity in order to resolve such defects.

3. First Working Example

[3-1. Deblocking Filter Configuration Example]

This section describes an exemplary configuration related to a first working example of the deblocking filter 24a in the image encoding device 10 illustrated in FIG. 1 and the deblocking filter 24b in the image decoding device 60 illustrated in FIG. 2. Note that the deblocking filter 24a and the deblocking filter 24b may share a common configuration. Consequently, in the description hereinafter, the deblocking filter 24a and the deblocking filter 24b will be collectively designated the deblocking filter 24 when not making a particular distinction between therebetween.

Figure 6:
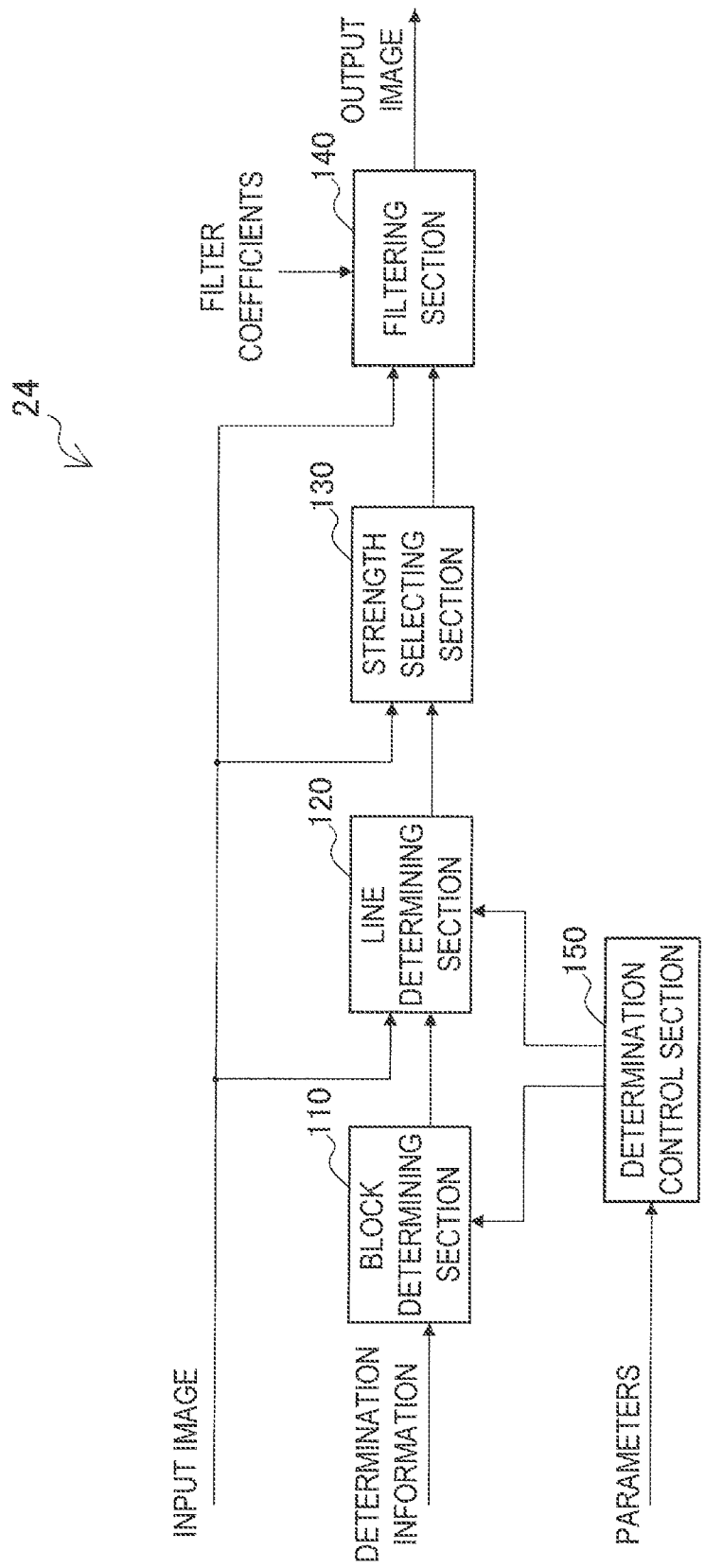
FIG. 6 is a block diagram illustrating an exemplary detailed configuration of a deblocking filter according to the first working example.

FIG. 6 is a block diagram illustrating an exemplary detailed configuration of a deblocking filter 24 according to the first working example. Referring to FIG. 6, the deblocking filter 24 includes a block determining section 110, a line determining section 120, a strength selecting section 130, a filtering section 140, and a determination control section 150.

(1) Block Determining Section

The block determining section 110 determines per-block determination conditions as preprocessing for the per-line determination conducted by the line determining section 120. Per-block determination conditions are typically based on at least one of the transform coefficients and coding parameters of the two neighboring blocks on either side of a boundary. The transform coefficients may be orthogonal transform coefficients, for example. The coding parameters may be one or both of prediction modes and motion vectors, for example. The per-block determination conditions may be the determination condition A from among the luma component determination conditions and the chroma component determination condition A1 in the existing technique discussed earlier, for example.

In other words, the block determining section 110 is supplied with determination information regarding the neighboring blocks neighboring across each boundary. The determination information supplied herein may include mode information, transform coefficient information, and motion vector information, for example. The block determining section 110 then determines whether or not the following condition A is satisfied as a per-block luma component determination for each boundary.

Condition A:

(A1) Block Ba or Bb is in an intra prediction mode;

(A2) Block Ba or Bb has a nonzero orthogonal transform coefficient; or (A3) $|MVAx-MVBx| \geq 4$ or $|MVAy-MVBy| \geq 4$ The block determining section 110 then causes the line determining section 120 to additionally conduct per-line determinations on boundaries satisfying condition A. On the other hand, the block determining section 110 causes the line determining section 120 to skip the per-line determinations on boundaries that do not satisfy condition A.

Also, the block determining section 110 determines whether or not the following condition A1 is satisfied as a per-block chroma component determination for each boundary.

Condition A1: Block Ba or Bb is in an intra prediction mode.

Per-line determination by the line determining section 120 may not be conducted for the chroma component. In this case, for a boundary satisfying condition A1, the filtering section 140 filters the chroma component on all lines at that boundary. For a boundary not satisfying condition A1, the chroma component on all lines at that boundary is not filtered.

Note that the per-block determination by the block determining section 110 described herein is merely one example. In other words, per-block determination conditions that differ from the determination conditions discussed above may also be used. For example, any of the determination conditions A1 to A3 may be omitted, and other conditions may also be added. Furthermore, per-line determinations like that described next may also be executed on the chroma component rather than being omitted.

(2) Line Determining Section

The line determining section 120 determines, for each line perpendicular to each boundary, whether or not to apply the deblocking filter to the two neighboring blocks neighboring across that boundary. The per-line determination condition may be the following determination condition B', for example.

Condition B':

$d=|p_{2i}-2p_{1i}+p_{0i}|+|q_{2i}-2q_{1i}+q_{0i}|$ where $d<(\beta>>1)$

Herein, d is a determination parameter, while $\beta$ is the edge determination threshold value discussed earlier. Also, i is a line index. If the block size of each block is 8×8 pixels, then i is an integer where $0 \leq i \leq 7$.

In other words, when making a determination for a particular line, the line determining section 120 follows condition B' and computes the value of the determination parameter d from only the reference pixel values belonging to that line in the two neighboring blocks Ba and Bb. The line determining section 120 then compares the computed value of the determination parameter d against a determination threshold value ($\beta>>1$). In this way, by referencing only the current line when making a determination for that line, it becomes possible to realize per-line determination with a comparatively simple configuration that sequentially accesses each line.

The line determining section 120 causes the strength selecting section 130 to select a filter strength and the filtering section 140 to apply filtering for lines that satisfy condition B', for example. On the other hand, the line determining section 120 causes the strength selecting section 130 to skip filter strength selection and the filtering section 140 to skip filtering for lines that do not satisfy condition B'.

(3) Strength Selecting Section

The strength selecting section 130 selects, for each line, the strength of the deblocking filter that the filtering section 140 will apply to that line. More specifically, the strength selecting section 130 selects the filter strength as follows for each line determined to need the deblocking filter by the line determining section 120.

Selecting the strength. The filter strength is selected for each line. The strong filter is selected if all of the following conditions C1' through C3 are satisfied. The weak filter is selected if any one of the conditions is not satisfied.

(C1') $d<(\beta>>3)$ (C2) $(|p_{3i}-p_{0i}|+|q_{0i}-q_{3i}|)<(\beta>>3)$ (C3) $|p_{0i}-q_{0i}|<((5tc+1)>>1)$ Herein, d is the determination parameter computed in the determination of condition B' discussed earlier. Note that such filter strength selection may be conducted on the luma component only. The strength selecting section 130 then outputs information expressing the selected filter strength (such as a flag indicating either the strong filter or the weak filter, for example) to the filtering section 140 for each line.

(4) Filtering Section

The filtering section 140 applies the deblocking filter to each line in the two neighboring blocks neighboring across respective boundaries according to the determination results from the block determining section 110 and the line determining section 120. The filter configuration of the filtering section 140 may be similar to that of the existing technique discussed earlier. For example, the filtering section 140 may compute filtered pixel values as follows for each line determined to need the deblocking filter by the line determining section 120.

Filtering Luma Component
With Weak Filter Selected:

$\Delta = \text{Clip}(-tc, tc, (13(q_{0i} - p_{0i}) + 4(q_{1i} - p_{1i}) - 5(q_{2i} - p_{2i}) + 16) >> 5))$ $p_{0j} = \text{Clip}_{0-255}(p_{0i} + \Delta)$ $q_{0j} = \text{Clip}_{0-255}(q_{0i} - \Delta)$ $p_{1i} = \text{Clip}_{0-255}(p_{1i} + \Delta/2)$ $q_{1i} = \text{Clip}_{0-255}(q_{1i} - \Delta/2)$ With Strong Filter Selected:

$p_{0i} = \text{Clip}_{0-255}((p_{2i} + 2p_{1i} + 2p_{0i} + 2q_{0i} + q_{1i} + 4) >> 3)$ $q_{0i} = \text{Clip}_{0-255}((p_{1i} + 2p_{0i} + 2q_{0i} + 2q_{1i} + q_{2i} + 4) >> 3)$ $p_{1i} = \text{Clip}_{0-255}((p_{2i} + p_{1i} + p_{0i} + q_{0i} + 2) >> 2)$ $q_{1i} = \text{Clip}_{0-255}((p_{0i} + q_{0i} + q_{1i} + q_{2i} + 2) >> 2)$ $p_{2i} = \text{Clip}_{0-255}((2p_{3i} + 3p_{2i} + p_{1i} + p_{0i} + q_{0i} + 4) >> 3)$ $q_{2i} = \text{Clip}_{0-255}((p_{0i} + q_{0i} + q_{1i} + 3q_{2i} + 2q_{3i} + 4) >> 3)$ Filtering Chroma Component $\Delta = \text{Clip}(-tc, tc, ((((q_{0i} - p_{0i}) << 2) + p_{1i} - q_{1i} + 4) >> 3))$ $p_{0i} = \text{Clip}_{0-255}(p_{0i} + \Delta)$ $q_{0i} = \text{Clip}_{0-255}(q_{0i} - \Delta)$ The filtering section 140 then successively outputs the filtered pixel values for pixels to which the filter was applied, while outputting the pixel values from the input image for other pixels, as the pixel values of the output image.

(5) Determination Control Section

The determination control section 150 controls the determination of the need to apply the deblocking filter conducted by the block determining section 110 and the line determining section 120. For example, the determination control section 150 may cause the line determining section 120 to skip the determination for entire lines with respect to a boundary to which the block determining section 110 determines to not apply the deblocking filter on the basis of the transform coefficients or coding parameters of the neighboring blocks.

As another example, the determination control section 150 may also dynamically switch the determination granularity, or in other words, the size of the unit of determination. More specifically, the determination control section 150 may cause only the block determining section 110 to conduct per-block determinations for a given image. Also, the determination control section 150 may cause the line determining section 120 to conduct per-line determinations without depending on the per-block determination results from the block determining section 110.

In the case of conducting per-line determinations, even if the unfiltered image quality is non-uniform within a block and uneven across lines, it is possible to switch the filtering on and off per each line in accordance with the image quality. As a result, image quality improves in the filtered image. On the other hand, in the case of conducting per-block determinations only, access to all lines is avoided for boundaries which are not filtered, and thus the processing load decreases overall, potentially improving the processing speed. Consequently, in conditions prioritizing processing speed, the determination control section 150 may select only per-block determinations.

The determination control section 150 may also dynamically switch the determination granularity on the basis of parameters included in the sequence parameter set, the picture parameter set, or the slice header, for example. For example, it is possible to specify a parameter in the above headers that specifies either per-block determinations or per-line determinations. The parameter may also be specified according to the individual requirements of the device developers, for example. The determination control section 150 may also switch the determination granularity according to other conditions instead, such as the size of the input image, for example.

[3-2. Process Flow]

Figure 7:
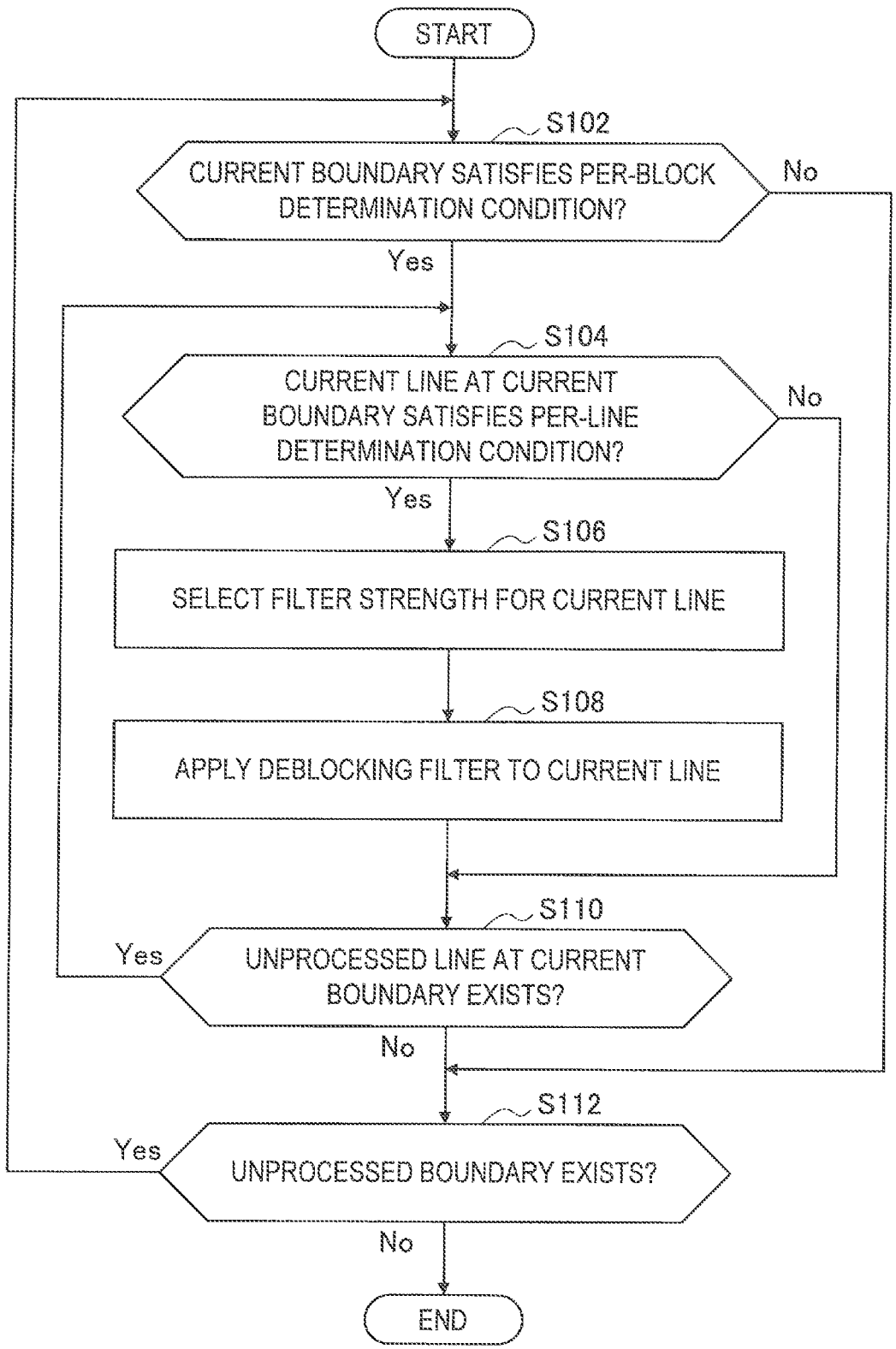
FIG. 7 is a flowchart illustrating an exemplary flow of a process by a deblocking filter according to the first working example.

FIG. 7 is a flowchart illustrating an exemplary flow of a process by the deblocking filter 24 according to the first working example. The processing from step S102 to step S112 in FIG. 7 is repeated individually for all boundaries (including vertical boundaries and horizontal boundaries) in an input image.

First, the block determining section 110 determines whether or not a single boundary to be processed (hereinafter designated the current boundary) satisfies a per-block determination condition (such as the determination condition A discussed earlier, for example) (step S102). At this point, if the per-block determination condition is not satisfied, the subsequent processing from step S104 to step S110 is skipped. On the other hand, if the per-block determination condition is satisfied, the process advances to step S104.

The processing from step S104 to step S110 is repeated individually for all lines at boundaries determined to satisfy the per-block determination condition. In step S104, the line determining section 120 determines whether or not a single line to be processed (hereinafter designated the current line) satisfies a per-line determination condition (such as the determination condition B' discussed earlier, for example) (step S104). At this point, if the per-line determination condition is not satisfied, the subsequent processing in step S106 and step S108 is skipped. On the other hand, if the per-line determination condition is satisfied, the process advances to step S106.

In step S106, the strength selecting section 130 selects the strength of the filter to apply to the current line, in accordance with the conditions C1' to C3 discussed earlier, for example (step S106).

The filtering section 140 then applies the deblocking filter to the current line (step S108).

After that, in the case where an unprocessed line remains at the current boundary, a new current line is set, and the process returns to step S104 (step S110). Meanwhile, in the case where no unprocessed lines remain at the current boundary, the process advances to step S112.

In step S112, in the case where an unprocessed boundary remains in the current input image, a new current boundary is set, and the process returns to step S102 (step S112). In the case where no unprocessed boundaries remain, the process ends for that input image.

Note that step S104 in the flowchart in FIG. 7 may be omitted in the case of conducting per-block determinations only. In addition, step S104 and step S106 in the flowchart in FIG. 7 may be skipped for the chroma component.

4. Second Working Example

[4-1. Deblocking Filter Configuration Example]

Figure 8:
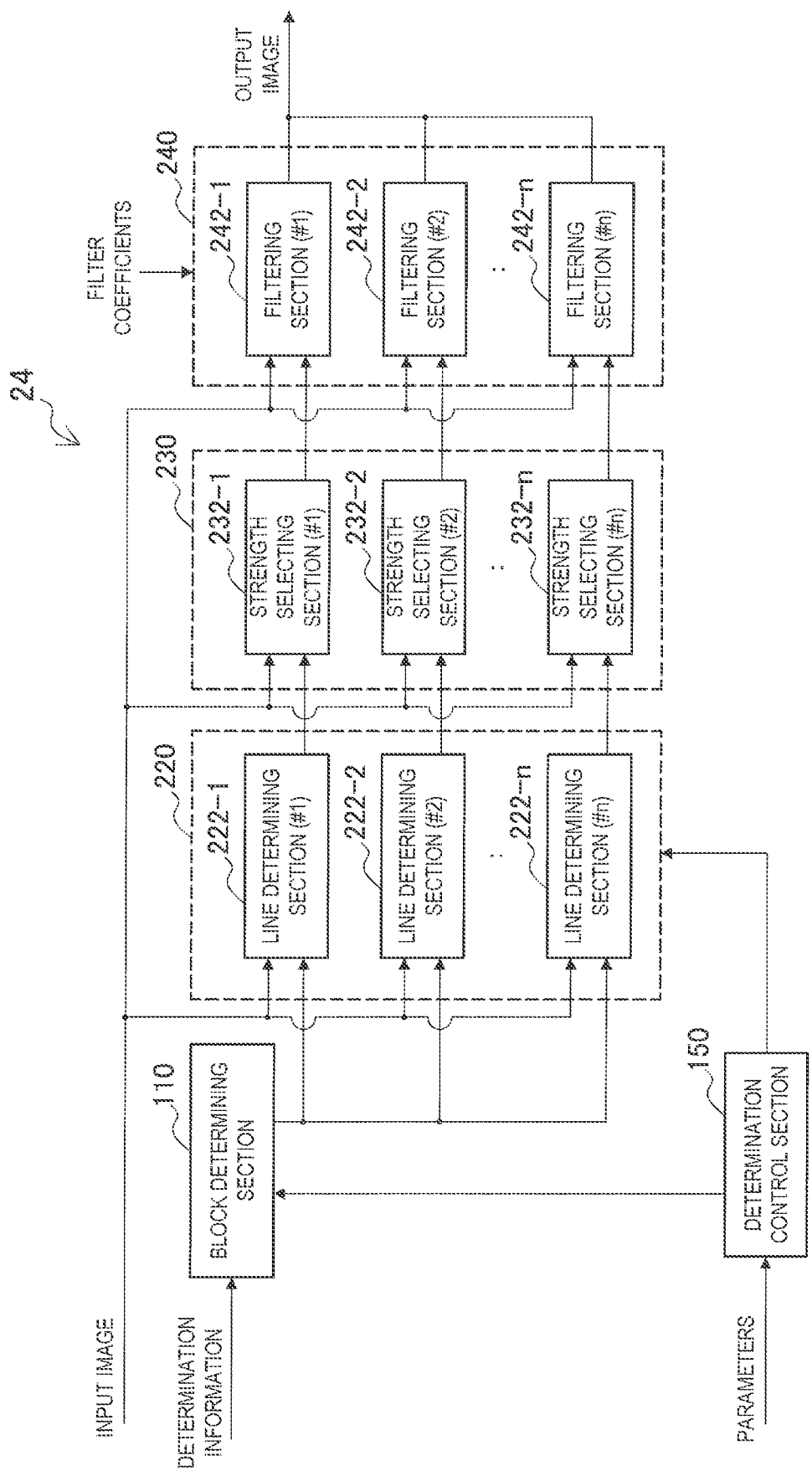
FIG. 8 is a block diagram illustrating an exemplary detailed configuration of a deblocking filter according to the second working example.

FIG. 8 is a block diagram illustrating an exemplary detailed configuration of a deblocking filter 24 according to the second working example. Referring to FIG. 8, the deblocking filter 24 includes a block determining section 110, a line determining group 220, a strength selecting group 230, a filtering group 240, and a determination control section 150.

(1) Line Determining Group

The processing by the line determining group 220 may be conducted on each boundary determined to satisfy the per-block determination condition in the block determining section 110. The line determining group 220 includes multiple line determining sections 222-1 to 222-n. In the case where the size of each block is 8×8 pixels, the value of n may be n=8 (values such as n=2 or n=4 are also acceptable). The line determining sections 222-1 to 222-n may process a single boundary in parallel.

The first line determining section 222-1 determines the need to apply the deblocking filter for a first line among the lines perpendicular to a particular boundary, in accordance with determination condition B' discussed earlier, for example. Then, in the case of determining that the first line satisfies determination condition B', the first line determining section 222-1 causes a first strength selecting section 232-1 to select a filter strength and a first filtering section 242-1 to apply filtering for the first line.

Likewise, the second line determining section 222-2 determines the need to apply the deblocking filter for a second line among the lines perpendicular to a particular boundary, in accordance with determination condition B' discussed earlier, for example. Then, in the case of determining that the second line satisfies determination condition B', the second line determining section 222-2 causes a second strength selecting section 232-2 to select a filter strength and a second filtering section 242-2 to apply filtering for the second line.

Similarly, the nth line determining section 222-n determines the need to apply the deblocking filter for an nth line among the lines perpendicular to a particular boundary, in accordance with determination condition B' discussed earlier, for example. Then, in the case of determining that the nth line satisfies determination condition B', the nth line determining section 222-n causes an nth strength selecting section 232-n to select a filter strength and an nth filtering section 242-n to apply filtering for the nth line.

(2) Strength Selecting Group

The strength selecting group 230 includes multiple strength selecting sections 232-1 to 232-n. Each strength selecting section 232 selects the strength of the deblocking filter to apply to a corresponding line, in accordance with conditions C1' to C3 discussed earlier, for example. Each strength selecting section 232 then outputs information expressing the selected filter strength (such as a flag indicating either the strong filter or the weak filter, for example) to a corresponding filtering section 242 in the filtering group 240. The strength selecting sections 232-1 to 232-n may process a single boundary in parallel.

(3) Filtering Group

The filtering group 240 includes multiple filtering sections 242-1 to 242-n. Each filtering section 242 applies the deblocking filter to a corresponding line in the two neighboring blocks neighboring across respective boundaries according to the determination results from the block determining section 110 and the corresponding line determining sections 222. The filter configuration of each filtering section 242 may be similar to that of the existing technique discussed earlier. Each filtering section 242 then outputs the filtered pixel values for pixels to which the filter was applied, while outputting the pixel values from the input image for other pixels, as the pixel values of the output image. The filtering sections 242-1 to 242-n may process a single boundary in parallel.

Note that in the second working example, the determination of the need to apply the deblocking filter by the block determining section 110 and the line determining group 220 may likewise be controlled by the determination control section 150 similarly to the first working example. For example, the determination control section 150 may control the line determining group 220 so as to determine in parallel whether to apply the deblocking filter for multiple lines in neighboring blocks.

[4-2. Process Flow]

Figure 9:
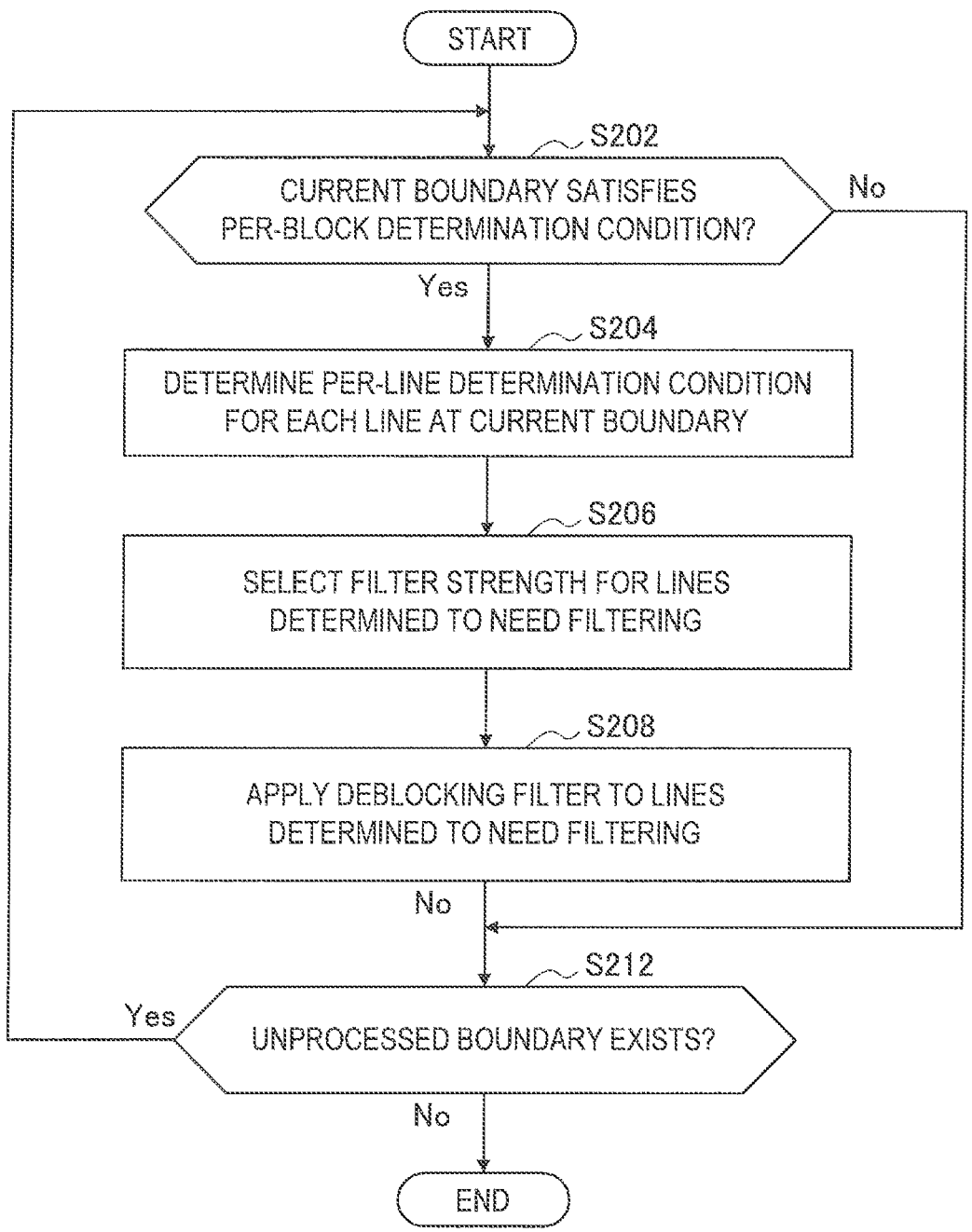
FIG. 9 is a flowchart illustrating an exemplary flow of a process by a deblocking filter according to the second working example.

FIG. 9 is a flowchart illustrating an exemplary flow of a process by the deblocking filter 24 according to the second working example. The processing from step S202 to step S212 in FIG. 9 is repeated individually for all boundaries (including vertical boundaries and horizontal boundaries) in an input image.

First, the block determining section 110 determines whether or not the current boundary satisfies a per-block determination condition (such as determination condition A discussed earlier, for example) (step S202). At this point, if the per-block determination condition is not satisfied, the subsequent processing from step S204 to step S208 is skipped. On the other hand, if the per-block determination condition is satisfied, the process advances to step S204.

Next, the line determining sections 222-1 to 222-n determine whether or not each line at the current boundary satisfies a per-line determination condition (such as determination condition B' discussed earlier, for example) (step S204).

Next, the strength selecting sections 232-1 to 232-n select the strength of the filter to individually apply to the lines determined to need filtering by the line determining sections 222-1 to 222-n from among the lines at the current boundary, in accordance with conditions C1' to C3 discussed earlier, for example (step S206).

The filtering sections 242-1 to 242-n then individually apply the deblocking filter to the lines determined to need filtering by the line determining sections 222-1 to 222-n from among the lines at the current boundary (step S208).

After that, in the case where an unprocessed boundary remains in the input image, a new current boundary is set, and the process returns to step S202 (step S212). In the case where no unprocessed boundaries remain, the process ends for that input image.

Note that step S204 in the flowchart in FIG. 9 may be omitted in the case of conducting per-block determinations only. In addition, step S204 and step S206 in the flowchart in FIG. 9 may be skipped for the chroma component.

5. Third Working Example

[5-1. Deblocking Filter Configuration Example]

In the foregoing first and second working examples, the need to apply the deblocking filter to each line is determined by comparing parameter values computed from the values of reference pixels belonging to that line (that is, each of the lines to be determined) against a determination threshold value. In contrast, the third working example described in this section introduces the concept of estimating parameter values in order to decrease processing costs associated with the repeated calculation of parameter values. In this working example, filter strength selection may likewise be conducted using estimated parameter values.

Figure 10:
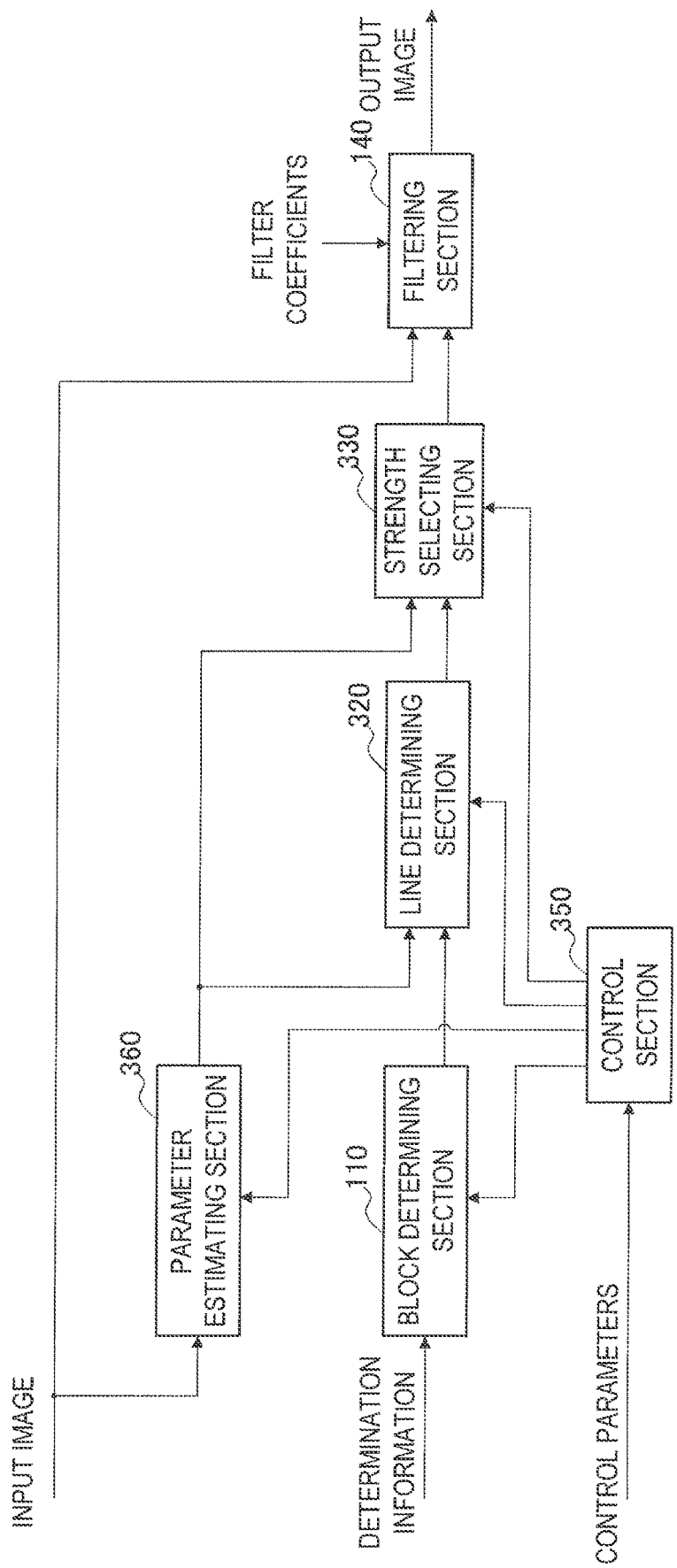
FIG. 10 is a block diagram illustrating an exemplary detailed configuration of a deblocking filter according to the third working example.

FIG. 10 is a block diagram illustrating an exemplary detailed configuration of a deblocking filter 24 according to the third working example. Referring to FIG. 10, the deblocking filter 24 includes a block determining section 110, a line determining section 320, a strength selecting section 330, a filtering section 140, a control section 350, and a parameter estimating section 360.

(1) Parameter Estimating Section

The parameter estimating section 360 calculates determination parameter values for at least one line perpendicular to each boundary from among the determination parameters used when the line determining section 320 conducts per-line determinations. The parameter estimating section 360 then estimates the values of the determination parameters for the remaining lines from the value calculated for the at least one line. In addition, the parameter estimating section 360 calculates and estimates the values of strength selection parameters used when the strength selecting section 330 selects the filter strength, similarly to the determination parameters. In the following description, the at least one line serving as the basis for estimating parameter values for the other lines will be designated the basis line (or basis lines), whereas the lines whose parameter values are estimated will be designated the estimated lines. The estimation of a parameter value for an estimated line from a basis line may be conducted by linear or nonlinear interpolation or extrapolation according to the line positions, for example. Hereinafter, FIGS. 11A, 11B and 11C will be used to describe three examples of a parameter estimating process conducted by the parameter estimating section 360.

(1-1) First Example

Figure 11A:
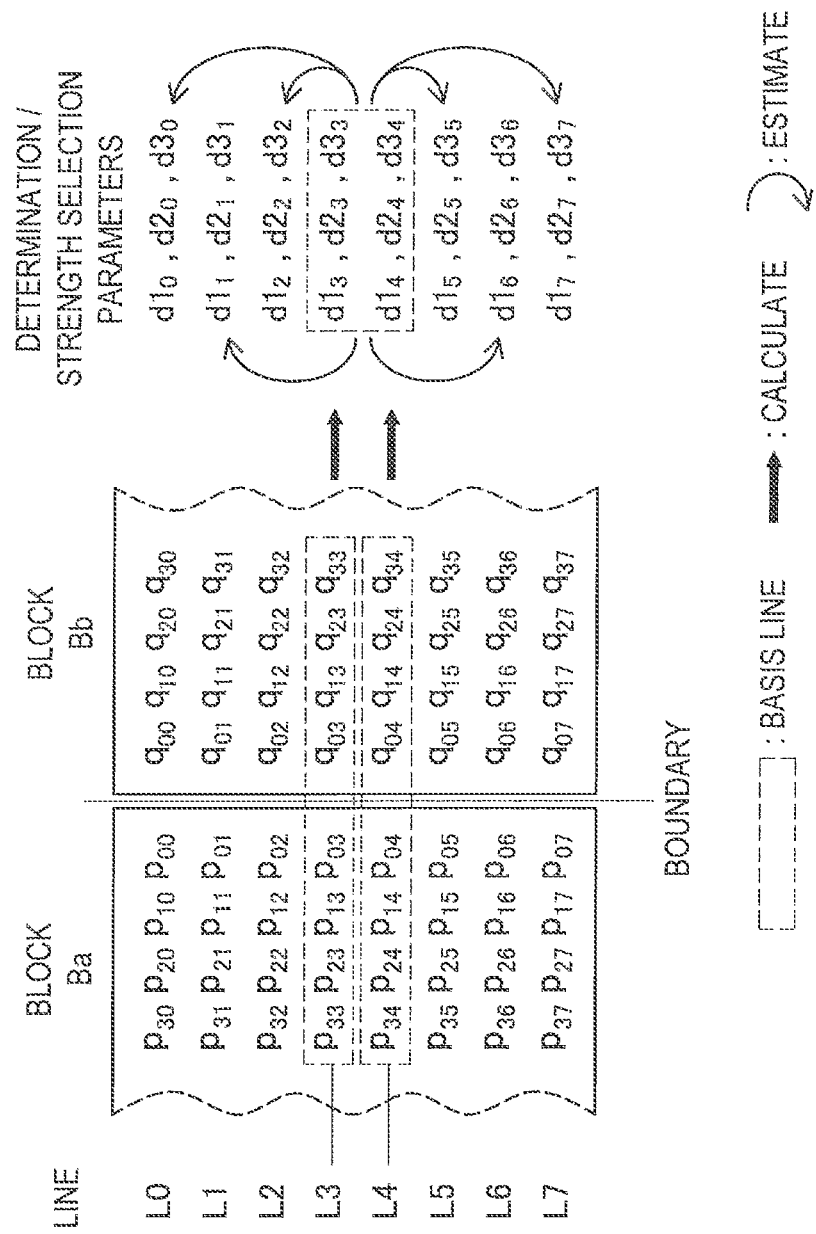
FIG. 11A is an explanatory diagram for explaining a first example of a parameter estimation process in a deblocking filter according to the third working example.

FIG. 11A illustrates two blocks Ba and Bb neighboring across a boundary. In the example in FIG. 11A, the basis lines are the two lines L3 and L4 perpendicular to the boundary in the central portion thereof. The estimated lines are the lines L0, L1, L2, L5, L6, and L7 other than the basis lines.

The parameter estimating section 360 calculates determination parameters $d1_i$ (where i equals 3 or 4) for evaluating the per-line determination condition B' discussed earlier according to, for example, the following formula:

$$d1_i = |p_{2i} - 2p_{1i} + p_{0i}| + |q_{2i} - 2q_{1i} + q_{0i}|$$

The parameter estimating section 360 then uses the calculated values of the two determination parameters $d1_3$ and $d1_4$ to estimate the determination parameters $d1_j$ (where j equals 0 to 2 and 5 to 7) for the estimated lines according to, for example, the following formulas:

$$d1_0 = 4d1_3 - 3d1_4$$

$$d1_1 = 3d1_3 - 2d1_4$$

$$d1_2 = 2d1_3 - 1d1_4$$

$$d1_5 = 2d1_4 - 1d1_3$$

$$d1_6 = 3d1_4 - 2d1_3$$

$$d1_7 = 4d1_4 - 3d1_3$$

Note that for an estimated line whose estimated value becomes negative according to the above estimation formulas, the parameter value calculated for the basis line closer to that estimated line may be used directly as the estimated value instead of the negative estimated value.

Similarly, the parameter estimating section 360 calculates parameters $d2_i$ and $d3_i$ (where i equals 3 or 4) for respectively evaluating conditions C2 and C3 in the filter strength selection discussed earlier according to, for example, the following formulas:

$$d2_i = |p_{3i} - p_{0i}| + |q_{0j} - q_{3j}|$$

$$d3_i = |p_{0i} - q_{0i}|$$

The parameter estimating section 360 then uses the calculated values of the strength selection parameters $d2_3$ and $d2_4$ to estimate the parameter value $d2_j$ (where j equals 0 to 2 and 5 to 7) for each estimated line. In addition, the parameter estimating section 360 uses the calculated values of the strength selection parameters $d3_3$ and $d3_4$ to estimate the parameter value $d3_j$ (where j equals 0 to 2 and 5 to 7) for each estimated line.

(1-2) Second Example

Figure 11B:
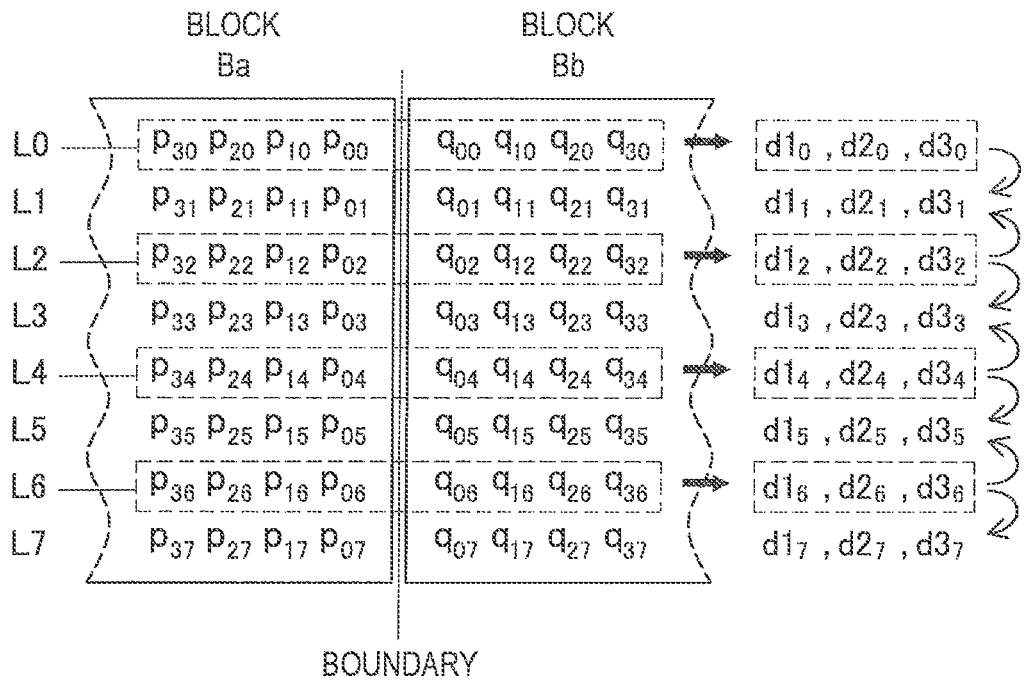
FIG. 11B is an explanatory diagram for explaining a second example of a parameter estimation process in a deblocking filter according to the third working example.

In the example in FIG. 11B, the basis lines are the lines L0, L2, L4, and L6 set every other line. The estimated lines are the lines L1, L3, L5, and L7 other than the basis lines.

The parameter estimating section 360 calculates determination parameters $d1_i$ (where i equals 0, 2, 4, or 6) for evaluating the per-line determination condition B' discussed earlier according to, for example, the formula described above in conjunction with the first example. The parameter estimating section 360 then estimates the determination parameter $d1_j$ (where j equals 1, 3, 5, or 7) for each estimated line by interpolation or extrapolation using the calculated determination parameter values. The parameter estimating section 360 similarly calculates the parameters $d2_i$ and $d3_i$ for selecting the filter strength for the basis lines. The parameter estimating section 360 then estimates the strength selection parameters $d2_j$ and $d3_j$ for each estimated line by interpolation or extrapolation using the calculated strength selection parameter values.

(1-3) Third Example

Figure 11C:
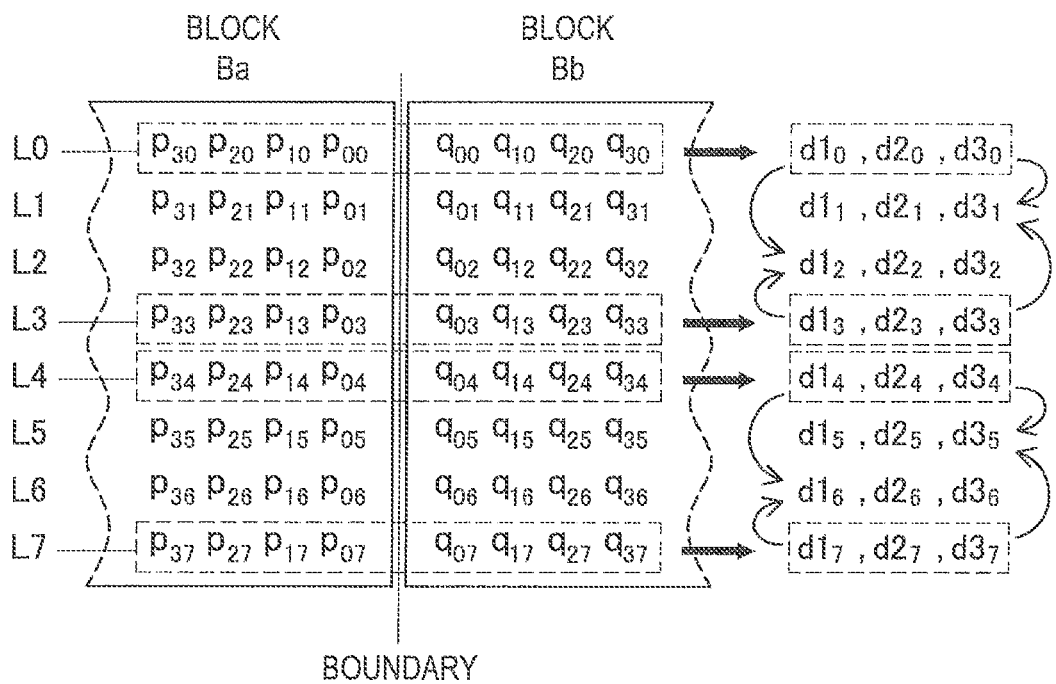
FIG. 11C is an explanatory diagram for explaining a third example of a parameter estimation process in a deblocking filter according to the third working example.

In the example in FIG. 11C, the basis lines are the lines L0, L3, L4, and L7. The estimated lines are the lines L1, L2, L5, and L6 other than the basis lines.

The parameter estimating section 360 calculates determination parameters $d1_i$ (where i equals 0, 3, 4, or 7) for evaluating the per-line determination condition B' discussed earlier according to, for example, the formula described above in conjunction with the first example. The parameter estimating section 360 then estimates the determination parameter $d1_j$ (where j equals 1, 2, 5, or 6) for each estimated line by interpolation using the calculated determination parameter values. The parameter estimating section 360 similarly calculates the parameters $d2_i$ and $d3_i$ for selecting the filter strength for the basis lines. The parameter estimating section 360 then estimates the strength selection parameters $d2_j$ and $d3_j$ for each estimated line by interpolation using the calculated strength selection parameter values.

The parameter estimating section 360 outputs the determination parameter values calculated and estimated according to any of these three examples to the line determining section 320, for example. In addition, the parameter estimating section 360 outputs the strength selection parameter values similarly calculated and estimated to the strength selecting section 330, for example.

Herein, the basis lines set in the first example are lines perpendicular to a boundary in the central portion thereof. The pixel values of pixels belonging to these basis lines are not updated by the deblocking filter applied in the same direction as that boundary. By calculating or estimating parameters for lines perpendicular to a boundary using the pixel values on such basis lines, it becomes possible to determine the need for filtering and select the filter strength on a per-line basis in parallel with the filtering process for other boundaries. Moreover, the filtering need determination and the filter strength selection may also be conducted in parallel. Meanwhile, according to basis line settings like those of the second example or the third example, the difference in line position between a basis line and an estimated line is small, thereby making it possible to more accurately estimate parameter values. According to the third example, since the outermost lines are set as basis lines, the estimation accuracy can be further improved by estimating parameter values for estimated lines with interpolation only.

(2) Line Determining Section

The line determining section 320 determines, for each line perpendicular to each boundary, whether or not to apply the deblocking filter to the two neighboring blocks neighboring across that boundary. In the third working example, the line determining section 320 makes determinations by using determination parameters calculated and estimated by the parameter estimating section 360. The per-line determination condition may be a condition similar to determination condition B' discussed earlier.

Condition B':

$d1_i < (\beta >> 1)$

If the block size of each block is 8×8 pixels, then i is an integer where $0 \leq i \leq 7$.

The line determining section 320 may also cause the strength selecting section 330 to select a filter strength only for lines that satisfy condition B', for example. Alternatively, the determination by the line determining section 320 and the filter strength selection by strength selecting section 330 may also be conducted in parallel. The line determining section 320 causes the filtering section 140 to skip filtering for lines that do not satisfy condition B'.

(3) Strength Selecting Section

The strength selecting section 330 selects, for each line, the strength of the deblocking filter that the filtering section 140 will apply to that line. In the third working example, the strength selecting section 330 selects a strength by using strength selection parameters calculated and estimated by the parameter estimating section 360. The strength selecting section 330 selects the strong filter if all of the following conditions C1' to C3 are satisfied, and selects the weak filter if any one of the conditions is not satisfied.

(C1') $d1_i < (\beta >> 3)$
(C2) $d2_i < (\beta >> 3)$
(C3) $de_i < ((5tC+1) >> 1)$ As condition C1' demonstrates, the above determination parameter $d1_i$ is also the strength selection parameter in this case.

The strength selecting section 330 then outputs information expressing the selected filter strength to the filtering section 140 for each line.

(5) Control Section

The control section 350 controls the parameter estimation process by the parameter estimating section 360, in addition to the control described with regard to the determination control section 150 in the first and second working examples. For example, the control section 350 recognizes the line position of a line to be processed, and identifies whether each line is a basis line or an estimated line. In addition, the control section 350 first causes the parameter estimating section 360 to respectively calculate the values of the determination parameter d1 of the basis lines as well as values of the strength selection parameters d2 and d3 of the according to from the pixel values of those basis line. After that, the control section 350 causes the parameter estimating section 360 to respectively estimate the values of determination parameters d1 of the estimated lines as well as the values of the strength selection parameters d2 and d3 of the estimated lines from the parameter values. calculated for the basis lines.

[5-2. Process Flow]

Figure 12:
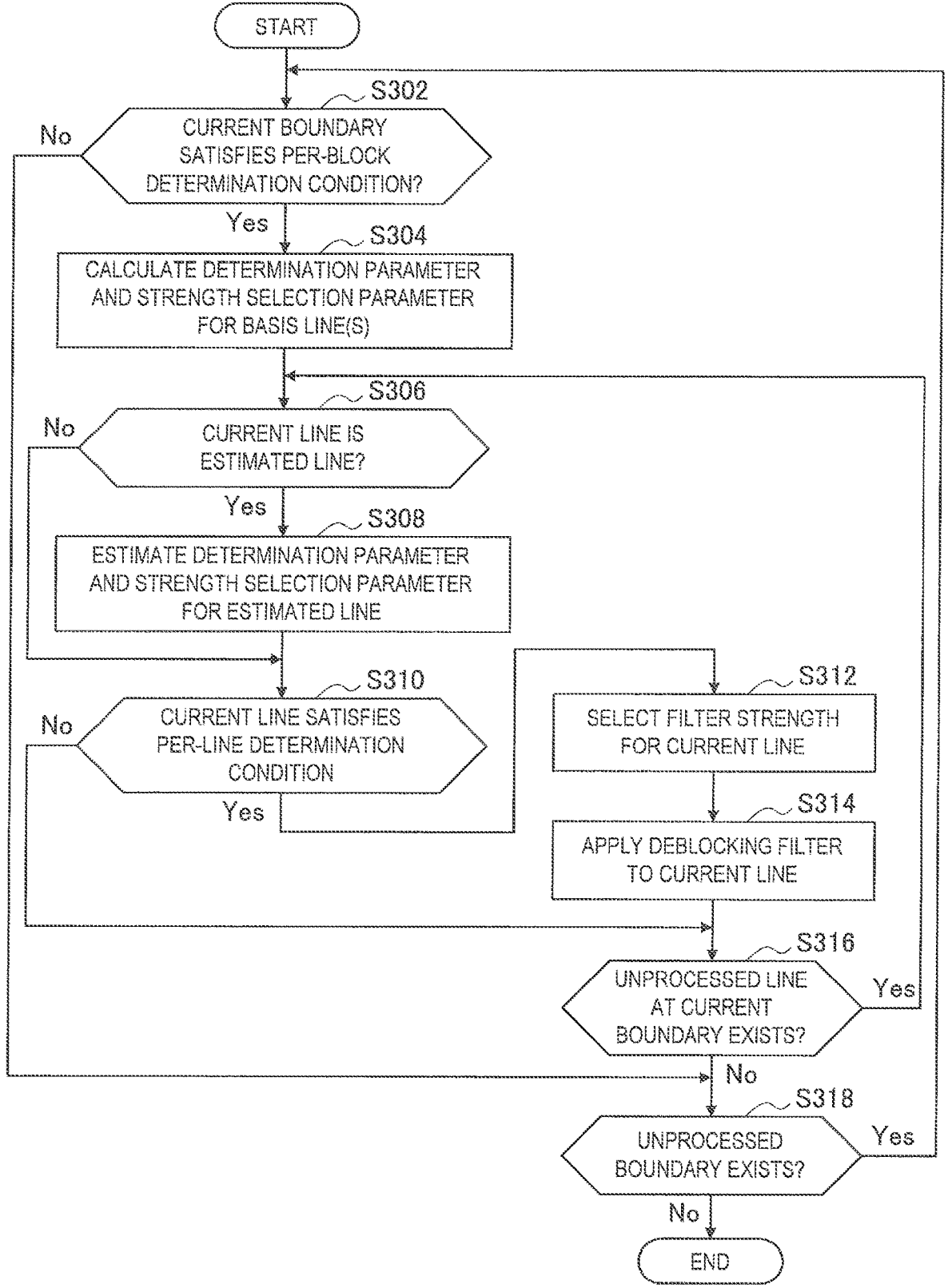
FIG. 12 is a flowchart illustrating an exemplary flow of a process by a deblocking filter according to the third working example.

FIG. 12 is a flowchart illustrating an exemplary flow of a process by the deblocking filter 24 according to the third working example. The processing from step S302 to step S318 in FIG. 12 is repeated individually for all boundaries (including vertical boundaries and horizontal boundaries) in an input image.

First, the block determining section 110 determines whether or not the current boundary satisfies a per-block determination condition (such as determination condition A discussed earlier, for example) (step S302). At this point, if the per-block determination condition is not satisfied, the subsequent processing from step S304 to step S316 is skipped. On the other hand, if the per-block determination condition is satisfied, the process advances to step S304.

In step S304, the parameter estimating section 360 calculates determination parameters and strength selection parameters for the basis lines perpendicular to the current boundary using the pixel values of pixels belonging to the basis lines. The basis lines at this point may be one or more lines set as in any of the three examples illustrated in FIGS. 11A, 11B and 11C, for example.

The processing from step S306 to step S316 is repeated for each current line, with every line perpendicular to the current boundary being individually treated as the current line. In step S306, the control section 350 recognizes the line position of the current line, and determines whether the current line is an estimated line (step S306). Then, if the current line is an estimated line, the parameter estimating section 360 respectively estimates a determination parameter and strength selection parameter for the current line by using the parameters calculated for the basis lines (step S308). On the other hand, if the current line is a basis line, the processing in step S308 is skipped.

Next, the line determining section 320 uses the determination parameter calculated or estimated by the parameter estimating section 360 to determine whether or not the current line satisfies a per-line determination condition (such as determination condition B' discussed earlier, for example) (step S310). At this point, if the per-line determination condition is not satisfied, the subsequent processing in step S312 and step S314 may be skipped. On the other hand, if the per-line determination condition is satisfied, the process advances to step S312.

In step S312, the strength selecting section 330 uses the strength selection parameter calculated or estimated by the parameter estimating section 360 to select the strength of the filter to apply to the current line, in accordance with conditions C1' to C3 discussed earlier, for example (step S312).

The filtering section 140 then applies the deblocking filter to the current line at the filter strength selected by the strength selecting section 330 (step S314).

After that, in the case where an unprocessed line remains at the current boundary, a new current line is set, and the process returns to step S306 (step S316). Meanwhile, in the case where no unprocessed lines remain at the current boundary, the process advances to step S318.

In step S318, in the case where an unprocessed boundary remains in the current input image, a new current boundary is set, and the process returns to step S302 (step S318). In the case where no unprocessed boundaries remain, the process ends for that input image.

6. Example Application

The image encoding device 10 and the image decoding device 60 according to the embodiment described above may be applied to various electronic appliances such as a transmitter and a receiver for satellite broadcasting, cable broadcasting such as cable TV, distribution on the Internet, distribution to client devices via cellular communication, and the like, a recording device that records images onto a medium such as an optical disc, a magnetic disk, or flash memory, and a playback device that plays back images from such storage media. Four example applications will be described below.

[6-1. First Example Application]

Figure 13:
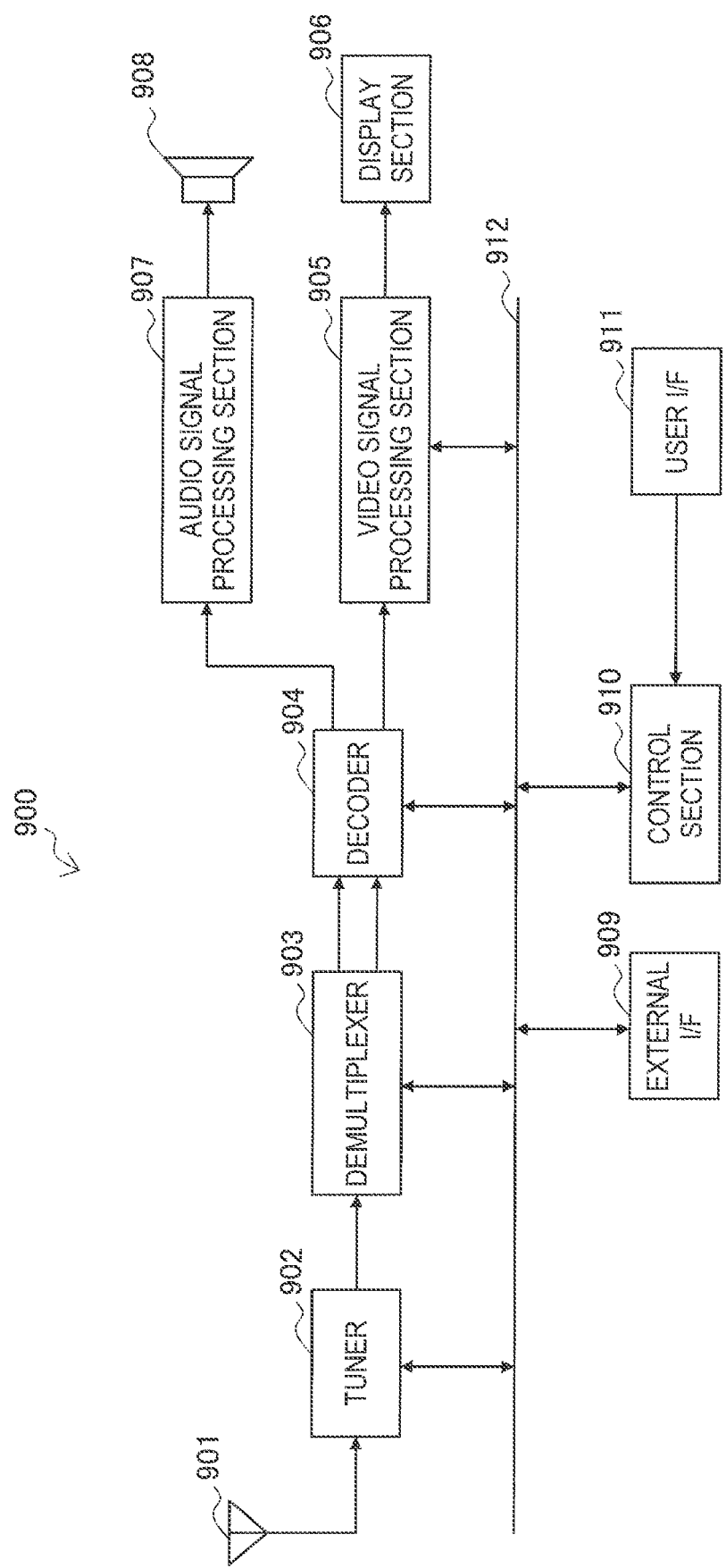
FIG. 13 is a block diagram illustrating an exemplary schematic configuration of a television.

FIG. 13 is a block diagram illustrating an exemplary schematic configuration of a television adopting the embodiment described above. A television 900 includes an antenna 901, a tuner 902, a demultiplexer 903, a decoder 904, a video signal processing section 905, a display section 906, an audio signal processing section 907, a speaker 908, an external interface 909, a control section 910, a user interface 911, and a bus 912.

The tuner 902 extracts a signal of a desired channel from broadcast signals received via the antenna 901, and demodulates the extracted signal. Then, the tuner 902 outputs an encoded bit stream obtained by demodulation to the demultiplexer 903. That is, the tuner 902 serves as transmission means of the television 900 for receiving an encoded stream in which an image is encoded.

The demultiplexer 903 separates a video stream and an audio stream of a program to be viewed from the encoded bit stream, and outputs the separated streams to the decoder 904. Also, the demultiplexer 903 extracts auxiliary data such as an electronic program guide (EPG) from the encoded bit stream, and supplies the extracted data to the control section 910. Additionally, the demultiplexer 903 may perform descrambling in the case where the encoded bit stream is scrambled.

The decoder 904 decodes the video stream and the audio stream input from the demultiplexer 903. Then, the decoder 904 outputs video data generated by the decoding process to the video signal processing section 905. Also, the decoder 904 outputs the audio data generated by the decoding process to the audio signal processing section 907.

The video signal processing section 905 plays back the video data input from the decoder 904, and causes the display section 906 to display the video. The video signal processing section 905 may also cause the display section 906 to display an application screen supplied via a network. Further, the video signal processing section 905 may perform additional processes such as noise removal, for example, on the video data according to settings. Furthermore, the video signal processing section 905 may generate graphical user interface (GUI) images such as menus, buttons, or a cursor, for example, and superimpose the generated images onto an output image.

The display section 906 is driven by a drive signal supplied by the video signal processing section 905, and displays a video or an image on a video screen of a display device (such as a liquid crystal display, a plasma display, or an OLED display, for example).

The audio signal processing section 907 performs playback processes such as D/A conversion and amplification on the audio data input from the decoder 904, and outputs audio from the speaker 908. Also, the audio signal processing section 907 may perform additional processes such as noise removal on the audio data.

The external interface 909 is an interface for connecting the television 900 to an external appliance or a network. For example, a video stream or an audio stream received via the external interface 909 may be decoded by the decoder 904. That is, the external interface 909 also serves as transmission means of the televisions 900 for receiving an encoded stream in which an image is encoded.

The control section 910 includes a processor such as a central processing unit (CPU), and memory such as random access memory (RAM), and read-only memory (ROM). The memory stores a program to be executed by the CPU, program data, EPG data, data acquired via a network, and the like. The program stored in the memory is read and executed by the CPU when activating the television 900, for example. By executing the program, the CPU controls the operation of the television 900 according to an operation signal input from the user interface 911, for example.

The user interface 911 is connected to the control section 910. The user interface 911 includes buttons and switches used by a user to operate the television 900, and a remote control signal receiver, for example. The user interface 911 detects an operation by the user via these structural elements, generates an operation signal, and outputs the generated operation signal to the control section 910.

The bus 912 interconnects the tuner 902, the demultiplexer 903, the decoder 904, the video signal processing section 905, the audio signal processing section 907, the external interface 909, and the control section 910.

In the television 900 configured in this manner, the decoder 904 functions as the image decoding device 60 according to the embodiment described above. Accordingly, when decoding an image in the television 900, it is likewise possible to more suitably determine the range to which to apply a deblocking filter, and improve image quality.

[6-2. Second Example Application]

Figure 14:
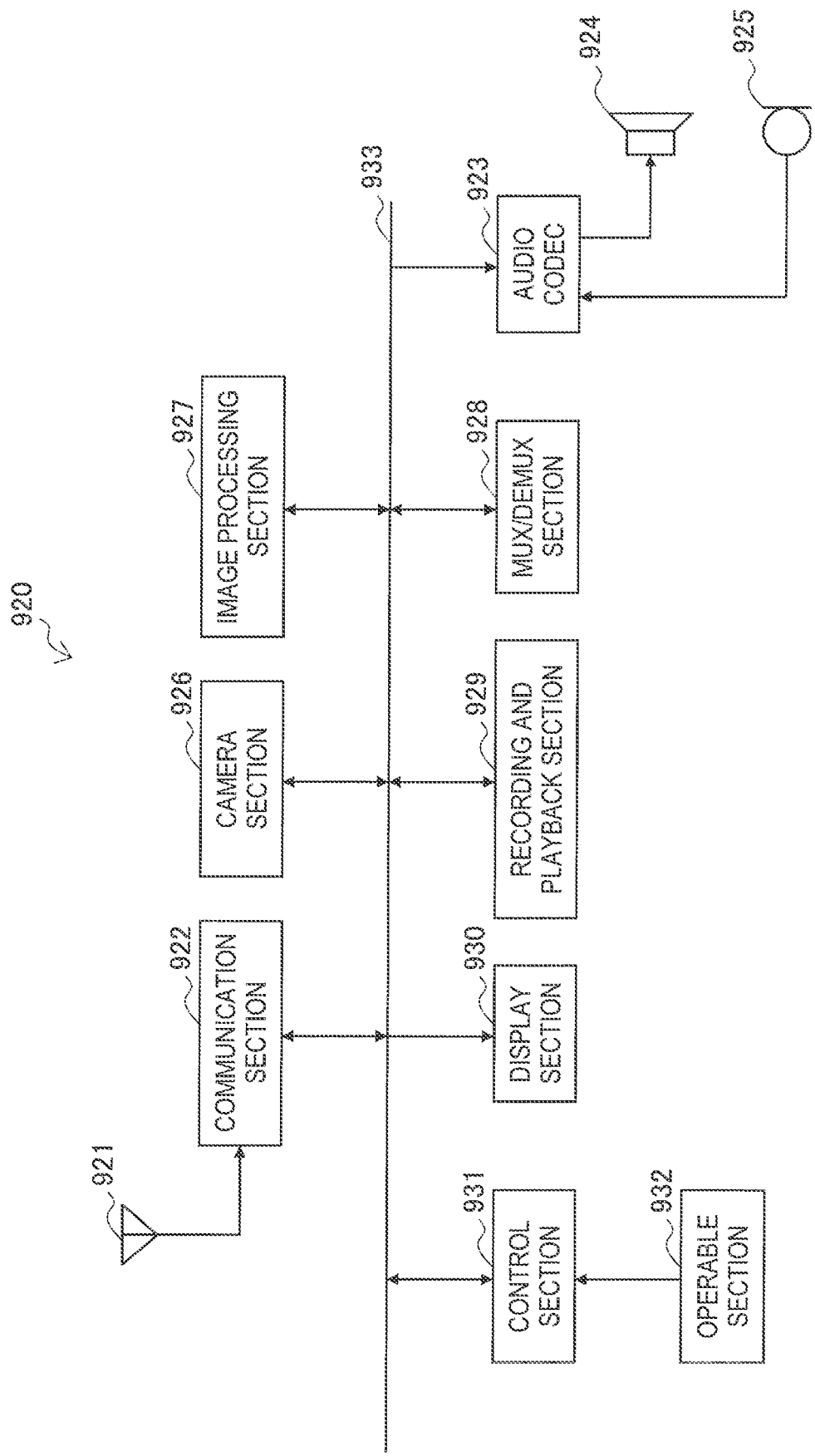
FIG. 14 is a block diagram illustrating an exemplary schematic configuration of a mobile phone.

FIG. 14 is a block diagram illustrating an exemplary schematic configuration of a mobile phone adopting the embodiment described above. A mobile phone 920 includes an antenna 921, a communication section 922, an audio codec 923, a speaker 924, a microphone 925, a camera section 926, an image processing section 927, a multiplexing/demultiplexing (mux/demux) section 928, a recording and playback section 929, a display section 930, a control section 931, an operable section 932, and a bus 933.

The antenna 921 is connected to the communication section 922. The speaker 924 and the microphone 925 are connected to the audio codec 923. The operable section 932 is connected to the control section 931. The bus 933 interconnects the communication section 922, the audio codec 923, the camera section 926, the image processing section 927, the mux/demux section 928, the recording and playback section 929, the display 930, and the control section 931.

The mobile phone 920 performs operations such as transmitting and receiving audio signals, transmitting and receiving emails or image data, taking images, and recording data in various operating modes including an audio communication mode, a data communication mode, an imaging mode, and a videophone mode.

In the audio communication mode, an analog audio signal generated by the microphone 925 is supplied to the audio codec 923. The audio codec 923 converts the analog audio signal into audio data, and A/D converts and compresses the converted audio data. Then, the audio codec 923 outputs the compressed audio data to the communication section 922. The communication section 922 encodes and modulates the audio data, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. Then, the communication section 922 demodulates and decodes the received signal and generates audio data, and outputs the generated audio data to the audio codec 923. The audio codec 923 decompresses and D/A converts the audio data, and generates an analog audio signal. Then, the audio codec 923 supplies the generated audio signal to the speaker 924 and causes audio to be output.

Also, in the data communication mode, the control section 931 generates text data that makes up an email, according to operations by a user via the operable section 932, for example. Moreover, the control section 931 causes the text to be displayed on the display section 930. Furthermore, the control section 931 generates email data according to transmit instructions from the user via the operable section 932, and outputs the generated email data to the communication section 922. The communication section 922 encodes and modulates the email data, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. Then, the communication section 922 demodulates and decodes the received signal, reconstructs the email data, and outputs the reconstructed email data to the control section 931. The control section 931 causes the display section 930 to display the contents of the email, and also causes the email data to be stored in the storage medium of the recording and playback section 929.

The recording and playback section 929 includes an arbitrary readable and writable storage medium. For example, the storage medium may be a built-in storage medium such as RAM, or flash memory, or an externally mounted storage medium such as a hard disk, a magnetic disk, a magneto-optical disc, an optical disc, USB memory, or a memory card.

Furthermore, in the imaging mode, the camera section 926 takes an image of a subject, generates image data, and outputs the generated image data to the image processing section 927, for example. The image processing section 927 encodes the image data input from the camera section 926, and causes the encoded stream to be stored in the storage medium of the recording and playback section 929.

Furthermore, in the videophone mode, the mux/demux section 928 multiplexes a video stream encoded by the image processing section 927 and an audio stream input from the audio codec 923, and outputs the multiplexed stream to the communication section 922, for example. The communication section 922 encodes and modulates the stream, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. The transmit signal and received signal may include an encoded bit stream. Then, the communication section 922 demodulates and decodes the received signal, reconstructs the stream, and outputs the reconstructed stream to the mux/demux section 928. The mux/demux section 928 separates a video stream and an audio stream from the input stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 decompresses and D/A converts the audio stream, and generates an analog audio signal. Then, the audio codec 923 supplies the generated audio signal to the speaker 924 and causes audio to be output.

In the mobile phone 920 configured in this manner, the image processing section 927 functions as the image encoding device 10 and the image decoding device 60 according to the embodiment described above. Accordingly, when encoding and decoding an image in the mobile phone 920, it is likewise possible to more suitably determine the range to which to apply a deblocking filter, and improve image quality.

[6-3. Third Example Application]

Figure 15:
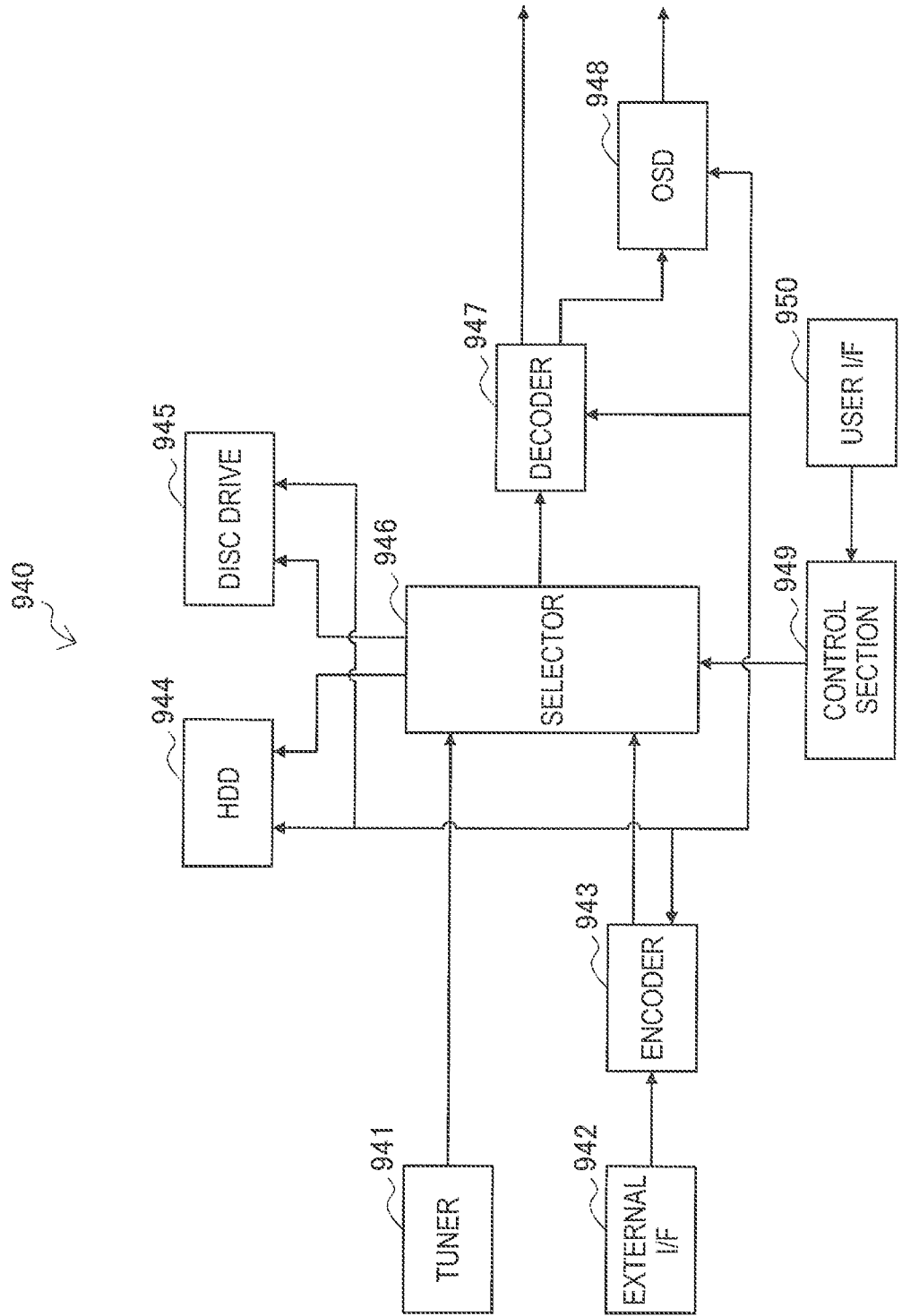
FIG. 15 is a block diagram illustrating an exemplary schematic configuration of a recording and playback device.

FIG. 15 is a block diagram illustrating an exemplary schematic configuration of a recording and playback device adopting the embodiment described above. A recording and playback device 940 encodes, and records onto a recording medium, the audio data and video data of a received broadcast program, for example. The recording and playback device 940 may also encode, and record onto the recording medium, audio data and video data acquired from another device, for example. Furthermore, the recording and playback device 940 plays back data recorded onto the recording medium via a monitor and speaker according to instructions from a user, for example. At such times, the recording and playback device 940 decodes the audio data and the video data.

The recording and playback device 940 includes a tuner 941, an external interface 942, an encoder 943, a hard disk drive (HDD) 944, a disc drive 945, a selector 946, a decoder 947, an on-screen display (OSD) 948, a control section 949, and a user interface 950.

The tuner 941 extracts a signal of a desired channel from broadcast signals received via an antenna (not illustrated), and demodulates the extracted signal. Then, the tuner 941 outputs an encoded bit stream obtained by demodulation to the selector 946. That is, the tuner 941 serves as transmission means of the recording and playback device 940.

The external interface 942 is an interface for connecting the recording and playback device 940 to an external appliance or a network. For example, the external interface 942 may be an IEEE 1394 interface, a network interface, a USB interface, a flash memory interface, or the like. For example, video data and audio data received by the external interface 942 are input into the encoder 943. That is, the external interface 942 serves as transmission means of the recording and playback device 940.

In the case where the video data and the audio data input from the external interface 942 are not encoded, the encoder 943 encodes the video data and the audio data. Then, the encoder 943 outputs the encoded bit stream to the selector 946.

The HDD 944 records onto an internal hard disk an encoded bit stream, which is compressed content data such as video or audio, various programs, and other data. Also, the HDD 944 reads such data from the hard disk when playing back video and audio.

The disc drive 945 records or reads data with respect to an inserted recording medium. The recording medium inserted into the disc drive 945 may be a DVD disc (such as a DVD-Video, DVD-RAM, DVD-R, DVD-RW, DVD+, or DVD+RW disc), a Blu-ray (registered trademark) disc, or the like, for example.

When recording video and audio, the selector 946 selects an encoded bit stream input from the tuner 941 or the encoder 943, and outputs the selected encoded bit stream to the HDD 944 or the disc drive 945. Also, when playing back video and audio, the selector 946 outputs an encoded bit stream input from the HDD 944 or the disc drive 945 to the decoder 947.

The decoder 947 decodes the encoded bit stream, and generates video data and audio data. Then, the decoder 947 outputs the generated video data to the OSD 948. Also, the decoder 904 outputs the generated audio data to an external speaker.

The OSD 948 plays back the video data input from the decoder 947, and displays video. Also, the OSD 948 may superimpose GUI images, such as menus, buttons, or a cursor, for example, onto displayed video.

The control section 949 includes a processor such as a CPU, and memory such as RAM or ROM. The memory stores a program to be executed by the CPU, program data, and the like. A program stored in the memory is read and executed by the CPU when activating the recording and playback device 940, for example. By executing the program, the CPU controls the operation of the recording and playback device 940 according to an operation signal input from the user interface 950, for example.

The user interface 950 is connected to the control section 949. The user interface 950 includes buttons and switches used by a user to operate the recording and playback device 940, and a remote control signal receiver, for example. The user interface 950 detects an operation by the user via these structural elements, generates an operation signal, and outputs the generated operation signal to the control section 949.

In the recording and playback device 940 configured in this manner, the encoder 943 functions as the image encoding device 10 according to the embodiment described above. Also, the decoder 947 functions as the image decoding device 60 according to the embodiment described above. Accordingly, when encoding and decoding an image in the recording and playback device 940, it is likewise possible to more suitably determine the range to which to apply a deblocking filter, and improve image quality.

[6-4. Fourth Example Application]

Figure 16:
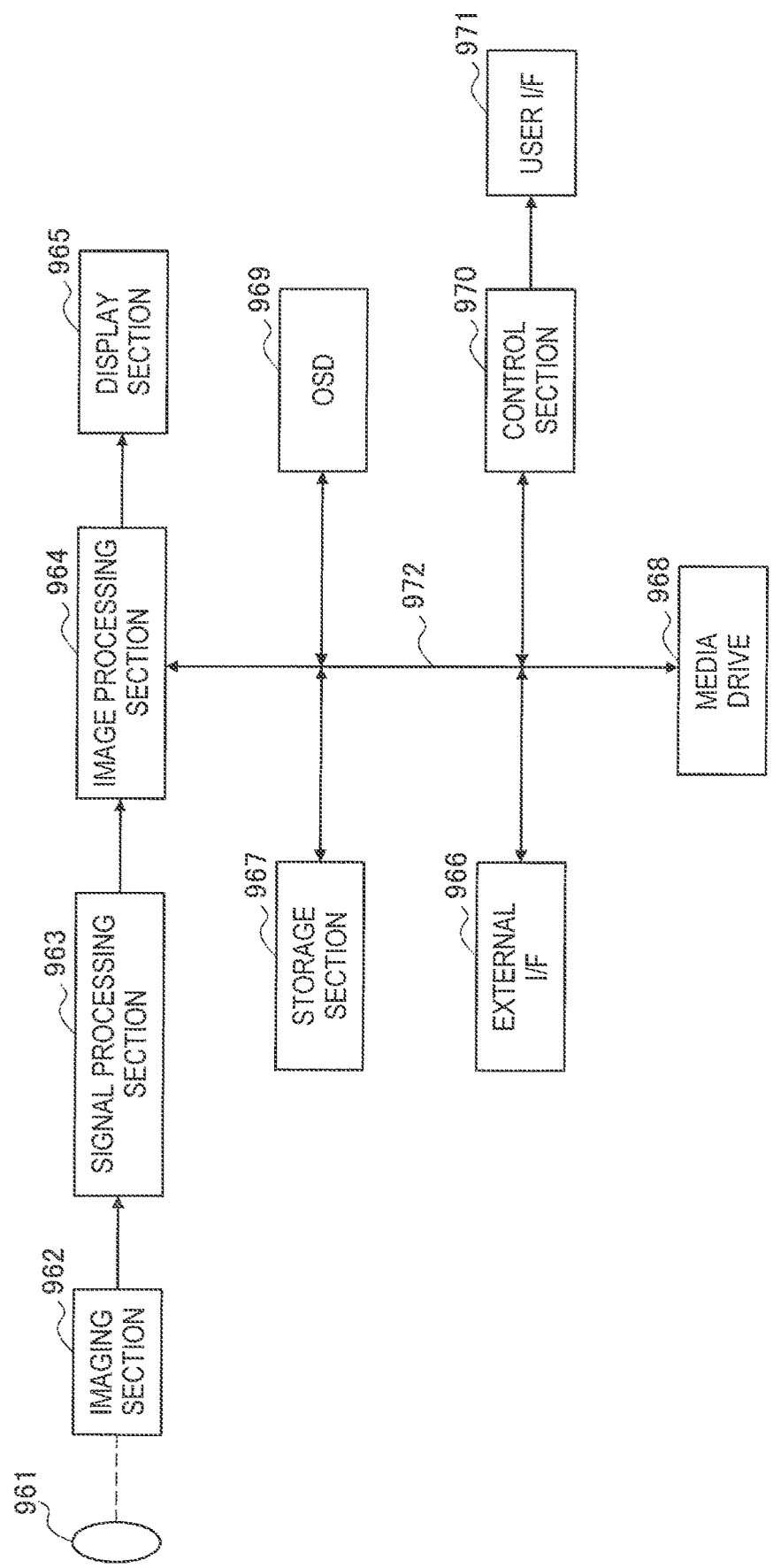
FIG. 16 is a block diagram illustrating an exemplary schematic configuration of an imaging device.

FIG. 16 is a block diagram showing an example of a schematic configuration of an imaging device adopting the embodiment described above. An imaging device 960 takes an image of a subject, generates an image, encodes the image data, and records the image data onto a recording medium.

The imaging device 960 includes an optical block 961, an imaging section 962, a signal processing section 963, an image processing section 964, a display section 965, an external interface 966, memory 967, a media drive 968, an OSD 969, a control section 970, a user interface 971, and a bus 972.

The optical block 961 is connected to the imaging section 962. The imaging section 962 is connected to the signal processing section 963. The display section 965 is connected to the image processing section 964. The user interface 971 is connected to the control section 970. The bus 972 interconnects the image processing section 964, the external interface 966, the memory 967, the media drive 968, the OSD 969, and the control section 970.

The optical block 961 includes a focus lens, an aperture stop mechanism, and the like. The optical block 961 forms an optical image of a subject on the imaging surface of the imaging section 962. The imaging section 962 includes an image sensor such as a CCD or CMOS sensor, and photoelectrically converts the optical image formed on the imaging surface into an image signal which is an electrical signal. Then, the imaging section 962 outputs the image signal to the signal processing section 963.

The signal processing section 963 performs various camera signal processes such as knee correction, gamma correction, and color correction on the image signal input from the imaging section 962. The signal processing section 963 outputs the processed image data to the image processing section 964.

The image processing section 964 encodes the image data input from the signal processing section 963, and generates encoded data. Then, the image processing section 964 outputs the encoded data thus generated to the external interface 966 or the media drive 968. Also, the image processing section 964 decodes encoded data input from the external interface 966 or the media drive 968, and generates image data. Then, the image processing section 964 outputs the generated image data to the display section 965. Also, the image processing section 964 may output the image data input from the signal processing section 963 to the display section 965, and cause the image to be displayed. Furthermore, the image processing section 964 may superimpose display data acquired from the OSD 969 onto an image to be output to the display section 965.

The OSD 969 generates GUI images such as menus, buttons, or a cursor, for example, and outputs the generated images to the image processing section 964.

The external interface 966 is configured as an USB input/output terminal, for example. The external interface 966 connects the imaging device 960 to a printer when printing an image, for example. Also, a drive is connected to the external interface 966 as necessary. A removable medium such as a magnetic disk or an optical disc, for example, is inserted into the drive, and a program read from the removable medium may be installed in the imaging device 960. Furthermore, the external interface 966 may be configured as a network interface to be connected to a network such as a LAN or the Internet. That is, the external interface 966 serves as transmission means of the image capturing device 960.

A recording medium to be inserted into the media drive 968 may be an arbitrary readable and writable removable medium, such as a magnetic disk, a magneto-optical disc, an optical disc, or semiconductor memory, for example. Also, a recording medium may be permanently installed in the media drive 968 to constitute a non-portable storage section such as an internal hard disk drive or a solid-state drive (SSD), for example.

The control section 970 includes a processor such as a CPU, and memory such as RAM or ROM. The memory stores a program to be executed by the CPU, program data, and the like. A program stored in the memory is read and executed by the CPU when activating the imaging device 960, for example. By executing the program, the CPU controls the operation of the imaging device 960 according to an operation signal input from the user interface 971, for example.

The user interface 971 is connected to the control section 970. The user interface 971 includes buttons, switches and the like used by a user to operate the imaging device 960, for example. The user interface 971 detects an operation by the user via these structural elements, generates an operation signal, and outputs the generated operation signal to the control section 970.

In the imaging device 960 configured in this manner, the image processing section 964 functions as the image encoding device 10 and the image decoding device 60 according to the embodiment described above. Accordingly, in the case of encoding and decoding an image in the image capturing device 960, it is possible to more suitably determine the range to which to apply a deblocking filter, and improve image quality.

7. Conclusion

The foregoing uses FIGS. 1 to 16 to describe in detail two working examples of a deblocking filter in an image encoding device 10 and an image decoding device 60 according to an embodiment. According to these two working examples, it is determined on a per-line basis whether or not to apply a deblocking filter to two neighboring blocks neighboring each other across a boundary in an image, and the deblocking filter is applied to each line according to the determination results. Consequently, determination at a finer granularity becomes possible compared to the case of determining the need to apply the deblocking filter on a per-block basis. Thus, there is a decreased likelihood of applying the deblocking filter to portions with good image quality already, and of not applying the deblocking filter to portions with degraded image quality. In other words, the filtered image quality can be improved.

Also, according to the present embodiment, determination on a per-line basis may be skipped for boundaries determined to not need the application of the deblocking filter on the basis of per-block determinations. Such a configuration avoids accessing all lines at boundaries at which filtering is not needed overall, thereby suppressing increases in the processing load.

In addition, according to the first and second working examples, whether or not to apply the deblocking filter to each line is determined by comparing the values of determination parameters computed from the values of reference pixels belonging to that line only against a determination threshold value. Consequently, it is possible to realize determinations on a per-line basis with a simple configuration that sequentially access each line.

Also, according to the second working example, the need to apply the deblocking filter is determined in parallel for multiple lines at a boundary. Consequently, the processing time required by determinations on a per-line basis can be shortened overall.

Moreover, according to the third working example, the parameter values used to determine the filtering need or select the filter strength for the estimated lines from among multiple lines perpendicular to a boundary are estimated from parameters calculated for one or more basis lines. Consequently, the processing costs associated with the repeated calculation of parameter values can be reduced. At this point, setting one or more lines perpendicular to a boundary in the central portion of that boundary as basis lines makes it possible to determine the filtering need and select the filter strength on a per-line basis for a boundary in parallel with the filtering process for other boundaries. In addition, making the difference in line position between a basis line and an estimated line smaller enables the realization of more accurate parameter value estimation.

In addition, according to the present embodiment, the need to apply the deblocking filter may be determined on a per-line basis in the case where a parameter specifying per-line determinations is included in the sequence parameter set, the picture parameter set, or the slice header. According to such a configuration, a device developer is able to specify via a parameter the more desirable between improved image quality by making per-line determinations, and fast processing speed by making per-block determinations.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

Note that the size of the unit of processing by the deblocking filter and the macro block size are not limited to the examples described in this specification, and may also be other sizes. For example, whereas the H.264/AVC macro block size is fixed at 16×16 pixels, the HEVC coding unit size may be dynamically specified for each sequence. HEVC coding units are also called coding tree blocks, in which the coding unit with the largest size is called the largest coding unit (LCU), and the coding unit with the smallest size is called the smallest coding unit (SCU). The range of usable coding unit sizes is defined by specifying the LCU and SCU sizes in the sequence parameter set forming part of the image compression information. Furthermore, by specifying the value of the split flag, the coding unit sizes used in individual sequences is specified. Note that the shape of a coding unit is ordinarily a square, with the size of one side expressed as a power of 2. Coding units may be additionally split into prediction units (PUs), which are the units of processing for intra prediction and inter prediction. Coding units may also be split into transform units (TUs), which are the units of processing for orthogonal transform. In HEVC, transform units having sizes of 16×16 pixels and 32×32 pixels may be used in addition to 4×4 pixels and 8×8 pixels. The term block in this specification encompasses the concept of macroblocks, coding units, prediction units, transform units, and various other units. The block size may be fixed, but may also change dynamically.

The technique of transmitting information used for a deblocking filter process from the encoding side to the decoding side is not limited to the technique of multiplexing the information into the encoded stream header. For example, the information may be transmitted or recorded as separate data associated with an encoded bit stream, without being multiplexed into the encoded bit stream. The term "associate" signifies the act of enabling an image (or part of an image, such as a slice or a block) contained in the bit stream to be linked with information corresponding to the image at the time of decoding. Namely, the information may be transmitted over a transmission path different from that used for images (or bit streams). The information may be recorded on a different recording medium (or a different recording area on the same recording medium) than that used for images (or bit streams). Information and images (or bit streams) may be associated with each other in arbitrary units such as multiple frames, single frames, or parts of frames, for example.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

| | |
|---|---|
| 10, 60 | Image processing device |
| 120, 222-1 to 222-n, 320 | Line determining section |
| 130, 232-1 to 232-n, 330 | Strength selecting section |
| 140, 242-1 to 242-n | Filtering section |
| 150, 350 | Control section |
| 360 | Parameter estimating section |

The invention claimed is:

1. An image processing device, comprising:
   one or more processors configured to:
   determine whether to apply a deblocking filter to a plurality of neighboring pixels that neighbors a block boundary within a locally decoded image, wherein
   the determination is based on only a plurality of pixel values within each of only 4 lines $L_i$ of 8 lines that cross the block boundary, and
   i=0, 3, 4, and 7;
   apply, based on the determination, the deblocking filter to the plurality of neighboring pixels to generate a filtered image; and
   encode an image using the filtered image.

2. The image processing device according to claim 1, wherein the one or more processors are further configured to compute a first determination parameter value for each of the only 4 lines $L_i$ of the 8 lines, based on reference pixel values of the plurality of pixel values within each of the only 4 lines $L_i$ of the 8 lines.

3. The image processing device according to claim 2, wherein
   the one or more processors are further configured to compute a second determination parameter value for remaining lines $L_j$ of the 8 lines based on the computed first determination parameter value of each of the only 4 lines $L_i$ of the 8 lines,
   wherein j=1, 2, 5, and 6, and
   the remaining lines $L_j$ of the 8 lines are lines other than the only 4 lines $L_i$ of the 8 lines.

4. The image processing device according to claim 1, wherein to determine whether to apply the deblocking filter the one or more processors are further configured to compare a corresponding determination parameter value of each of the only 4 lines $L_i$ of the 8 lines with a threshold determination parameter value.

5. An image processing method, comprising:
   determining whether to apply a deblocking filter to a plurality of neighboring pixels that neighbors a block boundary within a locally decoded image, wherein
   the determination is based on only a plurality of pixel values within each of only 4 lines $L_i$ of 8 lines crossing the block boundary, and
   i=0, 3, 4, and 7;
   applying, based on the determination, the deblocking filter to the plurality of neighboring pixels to generate a filtered image; and
   encoding an image using the filtered image.

6. The image processing method according to claim 5, wherein determining whether to apply the deblocking filter further comprises comparing a corresponding determination parameter value of each of the only 4 lines $L_i$ of the 8 lines with a threshold determination parameter value.

* * * * *